US009414686B1

(12) United States Patent  (10) Patent No.: US 9,414,686 B1
Corcorran et al.  (45) Date of Patent: *Aug. 16, 2016

(54) SEAT ASSEMBLY

(71) Applicant: Steelcase Inc., Grand Rapids, MI (US)

(72) Inventors: Sean M Corcorran, East Grand Rapids, MI (US); Keith Robert Machin, Wyoming, MI (US); Cody Jay Holstege, Zeeland, MI (US); William Carey, San Francisco, CA (US); Larry Cheng, Palo Alto, CA (US); Elger Oberwelz, San Francisco, CA (US); Thomas Overthun, San Francisco, CA (US); Lukas Martin Scherrer, San Francisco, CA (US); Joerg Christoph Student, San Francisco, CA (US); David J Battey, Caledonia, MI (US); Nickolaus William Charles Deevers, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,536

(22) Filed: Oct. 2, 2015

Related U.S. Application Data

(63) Continuation of application No. 14/793,784, filed on Jul. 8, 2015, which is a continuation of application No. 14/179,888, filed on Feb. 13, 2014, which is a continuation of application No. 14/104,473, filed on (Continued)

(51) Int. Cl.
*A47B 83/02* (2006.01)
*A47C 7/70* (2006.01)

(Continued)

(52) U.S. Cl.
CPC . *A47C 7/70* (2013.01); *A47B 83/02* (2013.01); *A47C 3/12* (2013.01); *A47C 3/18* (2013.01); *A47C 3/30* (2013.01); *A47C 7/006* (2013.01); *A47C 7/62* (2013.01)

(58) Field of Classification Search
CPC .......... A47B 83/02; A47C 3/12; A47C 7/002; A47C 7/004; A47C 7/006; A47C 9/00; A47C 3/18; A47C 7/70; A47C 7/62; A47C 3/30
See application file for complete search history.

(56) References Cited

U.S. PATENT DOCUMENTS 336,220 A  2/1886  Farrar
564,044 A  7/1896  Berkemeyer (Continued)

FOREIGN PATENT DOCUMENTS

EP  0995376 A1  4/2000

*Primary Examiner* — Philip Gabler
(74) *Attorney, Agent, or Firm* — Quarles & Brady LLP

(57) ABSTRACT

A seating assembly comprising a seat structure including a seat member having an undersurface and a seat edge, a mounting bracket mounted to the undersurface of the seat member, a base including a central hub and a plurality of leg members, the mounting bracket mounted to the base and spaced above the central hub, a first vertical axis passing through the central hub, a base tube mounted to and extending upward along the first vertical axis from the central hub, a mounting collar mounted to the base tube for rotation about the first vertical axis, the mounting collar positioned proximate the mounting bracket and located at least in part located between the mounting bracket and the central hub, a support arm having first and second ends, the first end mounted to the mounting collar for rotation therewith about the vertical axis, the support arm extending radially outward from the mounting collar along the undersurface of the seat member and upward to the second end and a tablet member mounted to the second end.

22 Claims, 24 Drawing Sheets

Related U.S. Application Data

Dec. 12, 2013, which is a continuation of application No. 12/987,273, filed on Jan. 10, 2011, now Pat. No. 8,696,056.

(60) Provisional application No. 61/300,298, filed on Feb. 1, 2010.

(51) Int. Cl.
*A47C 7/62* (2006.01)
*A47C 7/00* (2006.01)
*A47C 3/30* (2006.01)
*A47C 3/18* (2006.01)
*A47C 3/12* (2006.01)

(56) References Cited

U.S. PATENT DOCUMENTS

| | | | |
|---|---|---|---|
| 1,023,620 A | 4/1912 | Burge | |
| 2,921,623 A | 1/1960 | Humphries et al. | |
| 2,954,073 A | 9/1960 | Junkunc | |
| 3,479,084 A | 11/1969 | Van Ryn | |
| 3,504,927 A | 4/1970 | Seki | |
| 3,572,831 A | 3/1971 | Barecki et al. | |
| 3,574,400 A | 4/1971 | Day | |
| 3,601,443 A | 8/1971 | Jones | |
| 3,712,669 A | 1/1973 | Cates | |
| 3,751,845 A | 8/1973 | van Leeuwen | |
| 3,796,430 A | 3/1974 | Sudo | |
| 3,859,930 A | 1/1975 | Sherwin | |
| 4,025,083 A | 5/1977 | Saint | |
| 4,123,078 A | 10/1978 | Murakami | |
| 4,136,908 A | 1/1979 | Crayne | |
| 4,140,311 A | 2/1979 | Murakami | |
| 4,171,132 A | 10/1979 | Kassai | |
| 4,171,847 A | 10/1979 | Tukui | |
| D254,610 S | 4/1980 | Kassai | |
| 4,203,624 A | 5/1980 | Hopkins | |
| 4,216,994 A | 8/1980 | Benoit | |
| 4,225,146 A | 9/1980 | Takeuchi | |
| 4,372,605 A | 2/1983 | Cervantes | |
| 4,500,134 A | 2/1985 | Kaneko et al. | |
| 4,645,167 A * | 2/1987 | Hardwick | B63B 29/04 248/283.1 |
| 4,672,898 A | 6/1987 | Davidson | |
| 4,728,067 A | 3/1988 | Steinmetzer et al. | |
| 4,770,410 A | 9/1988 | Brown | |
| 4,848,833 A | 7/1989 | Grall | |
| 4,861,102 A | 8/1989 | Fuller | |
| 4,977,848 A | 12/1990 | Currey | |
| 5,071,149 A | 12/1991 | Perego | |
| 5,083,806 A | 1/1992 | Brown | |
| 5,087,096 A | 2/1992 | Yamazaki | |
| 5,169,210 A | 12/1992 | Fricano | |
| 5,228,708 A | 7/1993 | Verdugo | |
| 5,490,710 A | 2/1996 | Dearing et al. | |
| 5,501,419 A | 3/1996 | Huang | |
| 5,529,374 A | 6/1996 | Wimberly, Jr. | |
| 5,547,247 A | 8/1996 | Dixon | |
| 5,573,301 A | 11/1996 | Scott | |
| 5,601,331 A | 2/1997 | Austin, Jr. et al. | |
| 5,630,648 A | 5/1997 | Allard et al. | |
| 5,653,499 A | 8/1997 | Goodall | |
| 5,669,107 A | 9/1997 | Carlsen et al. | |
| 5,816,649 A | 10/1998 | Shields | |
| 5,845,964 A | 12/1998 | Phoon | |
| 5,884,974 A | 3/1999 | Bergsten et al. | |
| 5,887,948 A | 3/1999 | Hannes | |
| 5,899,526 A | 5/1999 | LaPointe et al. | |
| 5,909,864 A | 6/1999 | Wang | |
| 5,931,528 A | 8/1999 | Shields | |
| 5,954,393 A | 9/1999 | Perrin | |
| 6,022,077 A | 2/2000 | Kirkland et al. | |
| 6,053,577 A | 4/2000 | Arko et al. | |
| 6,059,357 A | 5/2000 | Peart | |
| 6,059,366 A | 5/2000 | Hu | |
| 6,073,997 A | 6/2000 | Koh | |
| 6,079,786 A | 6/2000 | Kirkland et al. | |
| 6,116,183 A | 9/2000 | Crow et al. | |
| D439,207 S | 3/2001 | Liu | |
| 6,224,149 B1 | 5/2001 | Gevaert | |
| 6,279,864 B1 | 8/2001 | Carnahan et al. | |
| D456,186 S | 4/2002 | Liu | |
| 6,375,257 B1 | 4/2002 | Wooding et al. | |
| 6,412,862 B1 | 7/2002 | Dickerson et al. | |
| 6,422,646 B1 * | 7/2002 | McNally | A47C 7/70 297/149 |
| 6,554,364 B1 | 4/2003 | Dammermann et al. | |
| 6,669,282 B2 | 12/2003 | Piretti | |
| 6,685,264 B2 | 2/2004 | Mullen et al. | |
| 6,733,073 B2 | 5/2004 | Whiteside et al. | |
| 6,773,060 B2 | 8/2004 | Sher et al. | |
| 6,776,452 B2 | 8/2004 | Onishi | |
| 6,830,294 B2 | 12/2004 | Berthiaume | |
| 6,837,539 B1 | 1/2005 | Casey | |
| 6,877,811 B1 | 4/2005 | Garelick | |
| 6,899,385 B2 | 5/2005 | Pernicka et al. | |
| 7,017,988 B2 | 3/2006 | Tornero et al. | |
| 7,100,977 B2 | 9/2006 | Burwell et al. | |
| D531,419 S | 11/2006 | Whiteside et al. | |
| D531,423 S | 11/2006 | Whiteside et al. | |
| 7,143,701 B2 | 12/2006 | Lindstrom et al. | |
| 7,210,736 B1 | 5/2007 | Large | |
| 7,216,929 B2 | 5/2007 | Lang et al. | |
| 7,216,930 B2 | 5/2007 | Steenson | |
| 7,370,910 B2 | 5/2008 | Piretti | |
| 7,380,886 B1 | 6/2008 | Copello | |
| 7,478,868 B2 | 1/2009 | Figueras Mitjans | |
| 7,506,923 B1 | 3/2009 | Gauss | |
| 7,530,632 B2 | 5/2009 | Kaloustian et al. | |
| 7,530,639 B2 | 5/2009 | Groelsma et al. | |
| D636,612 S | 4/2011 | Overthun et al. | |
| D679,517 S | 4/2013 | Corcorran et al. | |
| D679,523 S | 4/2013 | Corcorran et al. | |
| D679,524 S | 4/2013 | Corcorran et al. | |
| D679,525 S | 4/2013 | Corcorran et al. | |
| D679,923 S | 4/2013 | Corcorran et al. | |
| D689,723 S | 9/2013 | Corcorran et al. | |
| D690,143 S | 9/2013 | Corcorran et al. | |
| 8,696,056 B2 | 4/2014 | Corcorran et al. | |
| 8,844,947 B1 | 9/2014 | Whiteside et al. | |
| 9,044,087 B1 | 6/2015 | Corcorran et al. | |
| 9,060,609 B1 | 6/2015 | Corcorran et al. | |
| 2004/0004372 A1 | 1/2004 | Mullen et al. | |
| 2006/0061149 A1 | 3/2006 | Tsai | |
| 2006/0109257 A1 | 5/2006 | Ambasz | |
| 2007/0284920 A1 | 12/2007 | Mehaffey et al. | |
| 2008/0258515 A1 | 10/2008 | Whiteside et al. | |
| 2008/0277977 A1 | 11/2008 | Kagan et al. | |
| 2009/0026812 A1 | 1/2009 | Figueras Mitjans | |
| 2009/0039692 A1 | 2/2009 | Tuckey et al. | |
| 2009/0108641 A1 | 4/2009 | Steenson | |

\* cited by examiner

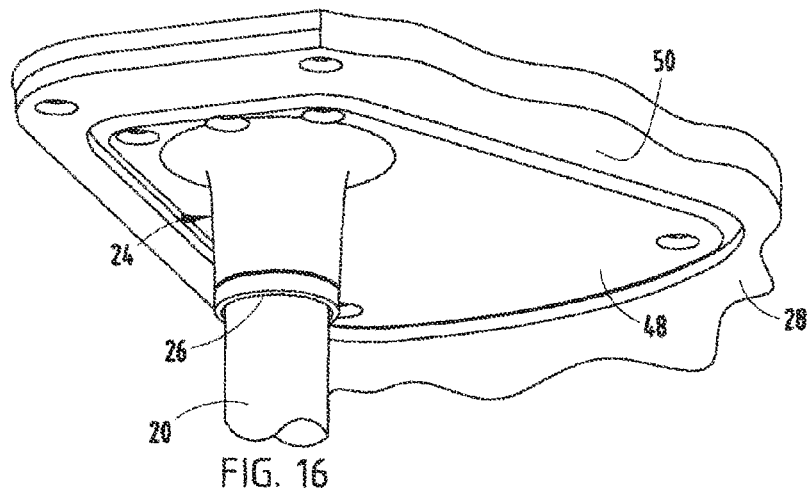
FIG. 16
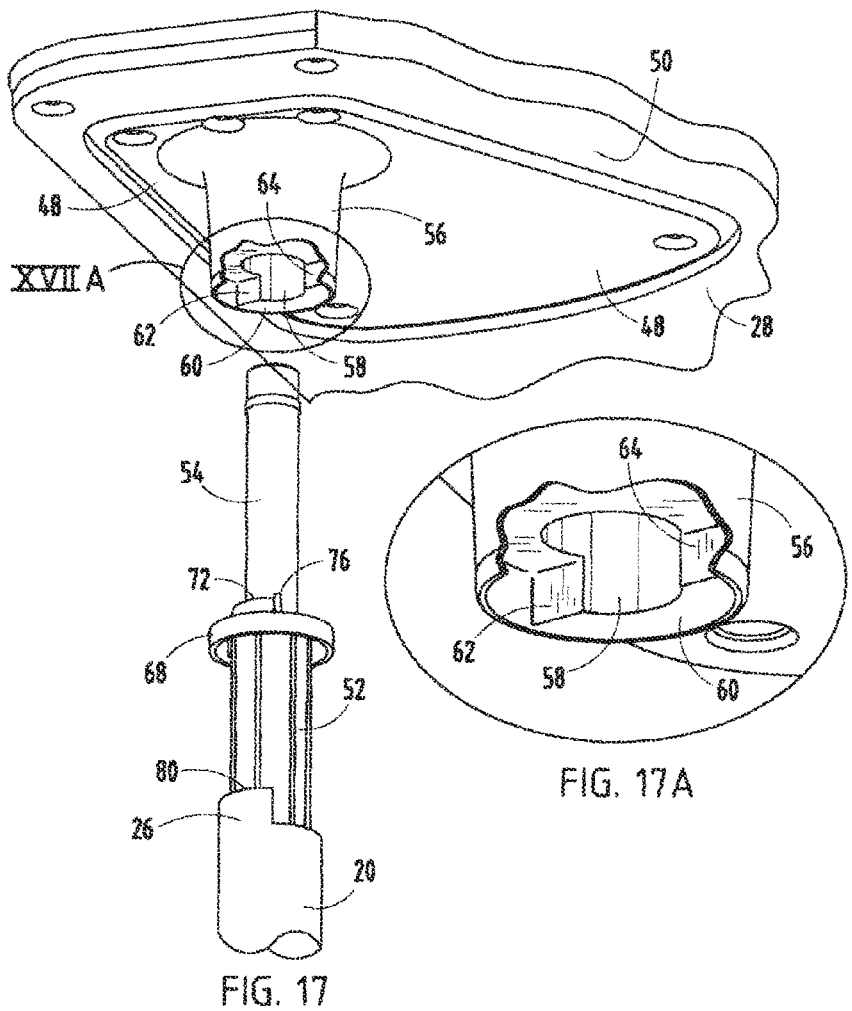
FIG. 17
FIG. 17A

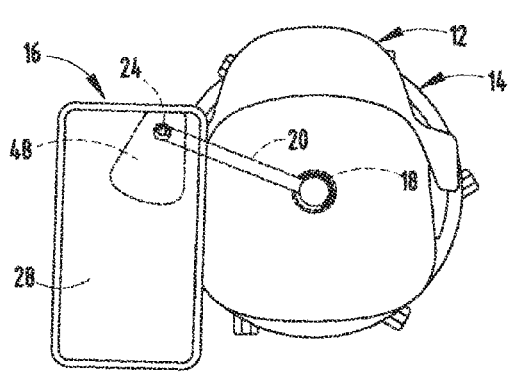 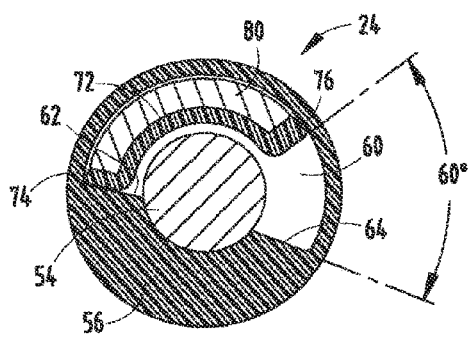
FIG. 20A — FIG. 20B
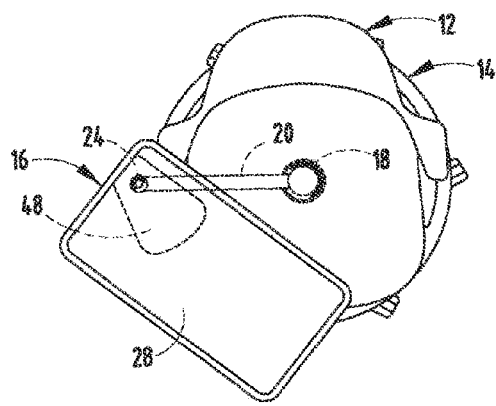 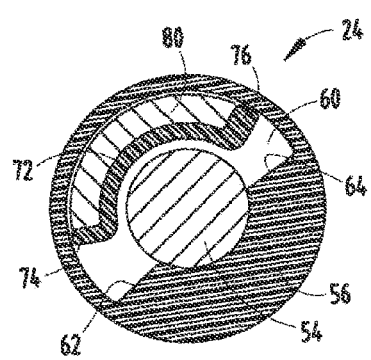
FIG. 21A — FIG. 21B
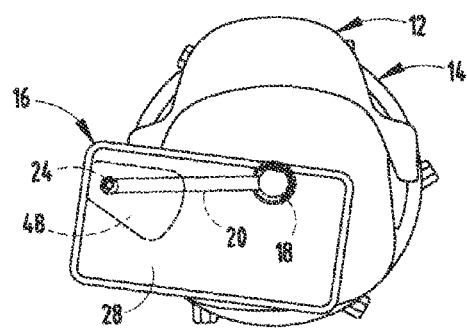 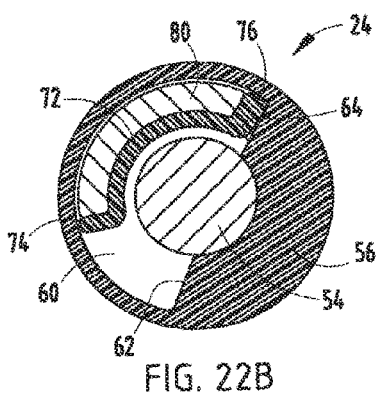
FIG. 22A — FIG. 22B

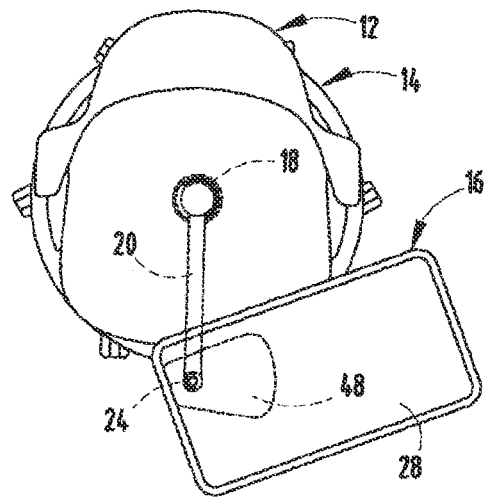
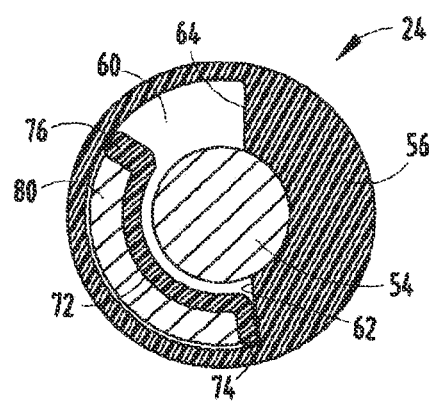
FIG. 23A
FIG. 23B
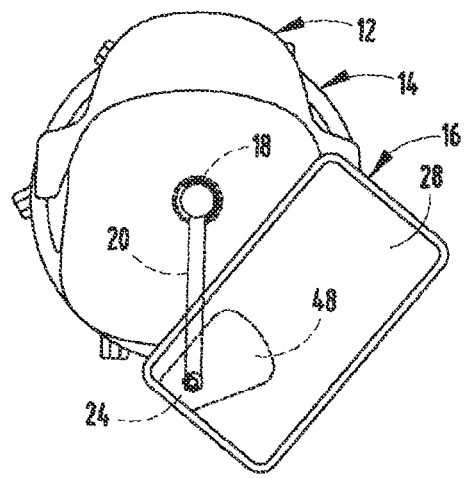
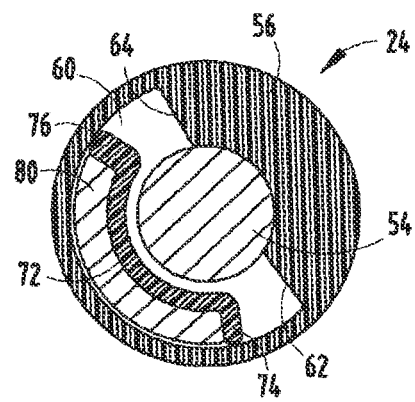
FIG. 24A
FIG. 24B
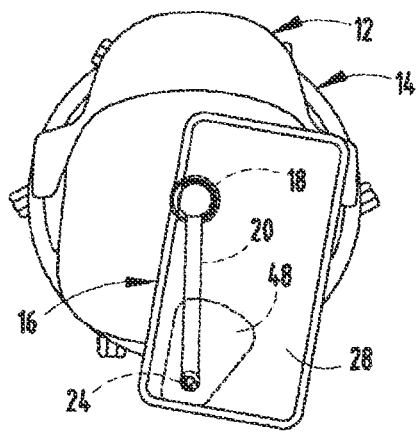
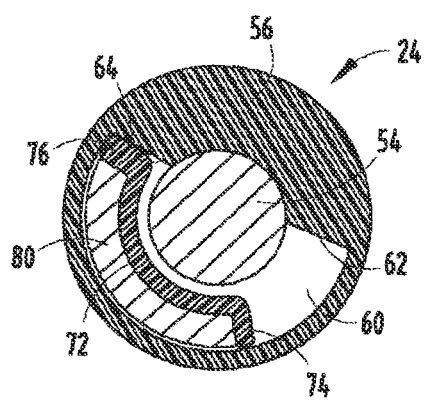
FIG. 25A
FIG. 25B

SEAT ASSEMBLY

CROSS-REFERENCE TO RELATED APPLICATIONS

This application is a continuation of U.S. patent application Ser. No. 14/793,784 filed on Jul. 8, 2015, which is a continuation of U.S. patent application Ser. No. 14/179,888 filed on Feb. 13, 2014, which is a continuation of U.S. patent application Ser. No. 14/104,473 filed on Dec. 12, 2013, which is a continuation of U.S. Pat. No. 8,696,056 filed on Jan. 10, 2011, and issued on Apr. 15, 2014, which claims priority to U.S. Provisional Patent Application Ser. No. 61/300,298 filed on Feb. 1, 2010, each of which are incorporated by reference herein.

BACKGROUND OF THE INVENTION

The present invention relates to a movable seating unit including an optional tablet assembly. More particularly, the present invention relates to a seating unit having a seat structure freely rotatable on a base, and optionally a tablet assembly. The tablet assembly includes a tablet which rotates on the end of a support arm and the support arm which rotates around the center shaft of the seating unit. The present invention also relates to a seating unit having a stable, mobile base with storage capability.

The need for learning is a fundamental rule of business, and a critical element of success. In an information age, effective, technology-driven learning is required not only in school, but also on the job. In part, effective learning depends on an environment which promotes interaction and collaboration with other students or coworkers and accommodates the use of multimedia technology. As new interactive technologies and multimedia training programs emerge, the use of seating designed to support the necessary amount of collaboration and self-direction is important.

Traditional classrooms, lecture halls, auditoriums, and meeting rooms often provide comfortable seating which allows students and employees to concentrate and take notes. However, traditional seating options are not sufficiently flexible to adapt to a variety of seating arrangements which foster interactions required for group learning. Typically, traditional seating options also do not provide storage and easy access to personal belongings. Whether it is a backpack, computer, briefcase or purse, in a dynamic learning environment, persons want their belongings to accompany them and be readily accessible. Seating must also provide a range of postural choices and accommodate persons of different sizes. Optionally, seating which promotes interaction and collaboration must also provide a worksurface that can be positioned in a variety of ways and is large enough for electronic devices such as a laptop computer.

At the same time, seating must be economical. In today's economy, both schools and companies must work within a limited budget. Thus, a low cost seating unit which provides comfort, convenience, durability and flexibility in learning and collaborating environments is desired.

BRIEF SUMMARY OF THE INVENTION

In one embodiment of the present invention, a seating unit includes a tablet assembly including a support arm attached at one end to the seating structure. A second end of the support arm includes a projection and is attached to a pivot assembly. The pivot assembly includes a tablet mount having a connecting portion, a bushing having a rib and an adjacent cutout, and an inner tube. The bushing is inserted into the support arm second end such that the projection protrudes through the cutout. The bottom of the inner tube is inserted into the bushing and the top of the inner tube is inserted into the connecting portion.

In another embodiment of the present invention, a seating unit includes a seat structure, a base and a tablet assembly mounted between the seat structure and the base. The seat structure includes a mounting bracket having a female connector. The tablet assembly includes a support arm having a mounting collar on one end. The base includes a base support and a base mounting assembly having a cup attached to the base support, a base tube having a first end inserted into the cup, and a second end extending through the mounting collar and mateably engaging the female connector.

In yet another embodiment of the present invention, a seating unit includes a seat structure, a pedestal base, and a tablet assembly mounted between the seat structure and the base. The seat structure includes a mounting bracket having a female connector. The pedestal base includes a gas cylinder having a top actuator button and a base mounting assembly. The base mounting assembly includes a receiver having a top male connector, a bottom internal taper, and an internal button extender. The tablet assembly includes a support arm having a mounting collar on one end of the support arm. The gas cylinder is inserted into the bottom internal taper such that the button extender abuts the top actuator button, and the top male connector extends through the mounting collar and mateably engages the female connector.

In another embodiment of the present invention, a seating unit includes a seat structure and a base. The base includes a top support and a bottom pan. The top support includes three or more curved legs which extend from a central hub. The pan is attached to the top support and includes twice as many casters as the top support has legs. Both the legs and casters are positioned equidistantly around a periphery of the pan, but the positioning of the legs is offset from the casters. In particular, the distance between a leg and an adjacent caster is approximately equal to $70/4x)-W/2$, where D is the diameter of the pan, x is the number of legs, and W is the width of the leg.

BRIEF DESCRIPTION OF THE DRAWINGS

The foregoing and other items and advantages of the present invention will be appreciated more fully from the following figures, where like reference characters designate like features in which:

FIG. 15 is a cross-sectional view of the base to seat mounting assembly of

FIG. 16 is a bottom perspective view of a pivot assembly of the seating units of FIGS. 1 and 7;

FIG. 17 is an exploded bottom perspective view of the pivot assembly of FIG. 16;

FIG. 17A is an enlarged fragmentary view of a connecting portion of a tablet mount of the pivot assembly of FIG. 17;

FIG. 20A is a top view of the seating unit of FIG. 1 where the tablet assembly including a pivot assembly and a mounting assembly is in a right side, fully outward position;

FIG. 20B is a cross-sectional view of the pivot assembly of FIG. 20A, showing pivot assembly stops corresponding to the right side, fully outward position;

FIG. 21A is a top view of the seating unit of FIG. 1 where the tablet assembly including a pivot assembly is in a right side, partially inward position;

FIG. 21B is a cross-sectional view of the pivot assembly of FIG. 21A, showing pivot assembly stops corresponding to the right side, partially inward position;

FIG. 22A is a top view of the seating unit of FIG. 1 where the tablet assembly including a pivot assembly and a mounting assembly is in a right side, fully inward position;

FIG. 22B is a cross-sectional view of the pivot assembly of FIG. 22A, showing pivot assembly stops corresponding to the right side, fully inward position;

FIG. 23A is a top view of the seating unit of FIG. 1 where the tablet assembly including a pivot assembly and a mounting assembly is in a front, outward position;

FIG. 23B is a cross-sectional view of the pivot assembly of FIG. 23A, showing pivot assembly stops corresponding to the front, outward position;

FIG. 24A is a top view of the seating unit of FIG. 1 where the tablet assembly including a pivot assembly and a mounting assembly is in a front, partially inward position;

FIG. 24B is a cross-sectional view of the pivot assembly of FIG. 24A, showing pivot assembly stops corresponding to the front, partially inward position;

FIG. 25A is a top view of the seating unit of FIG. 1 where the tablet assembly including a pivot assembly and a mounting assembly is in a front, fully inward position;

FIG. 25B is a cross-sectional view of the pivot assembly of FIG. 25A, showing pivot assembly stops corresponding to the front, fully inward position;

DETAILED DESCRIPTION OF THE INVENTION

Figure 1:
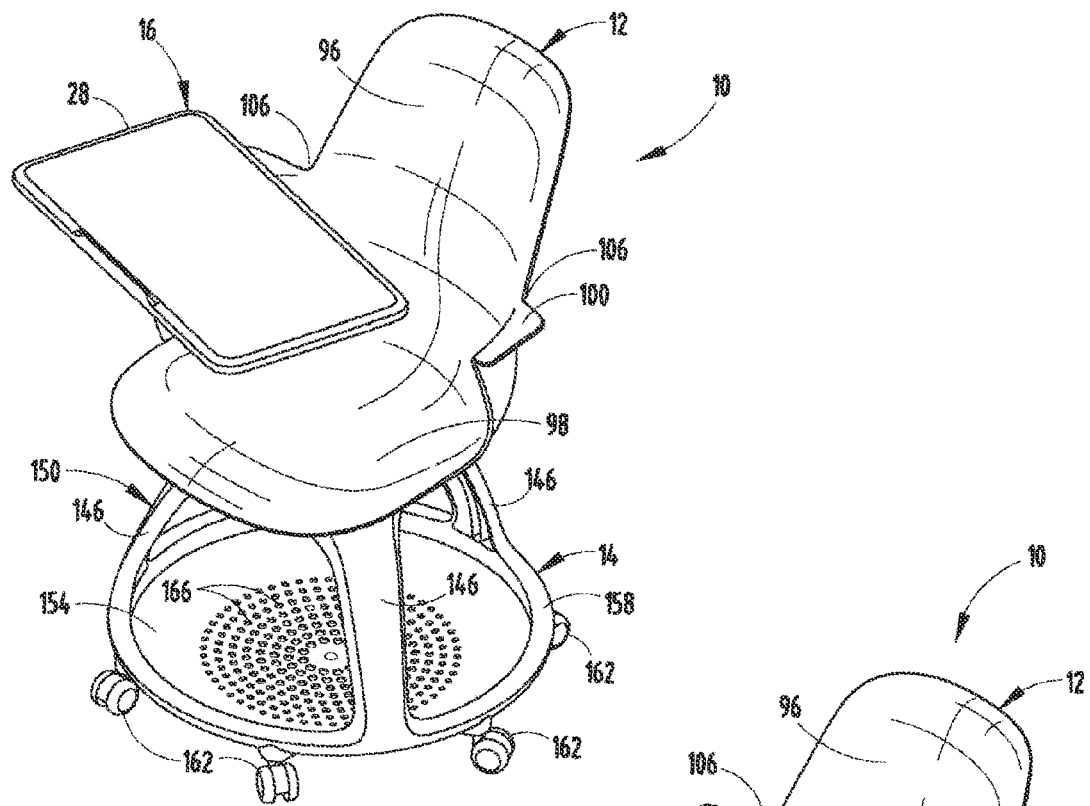
FIG. 1 is a perspective view of a seating unit in a first embodiment, the seating unit including a tripod base and a tablet assembly.
Figure 2:
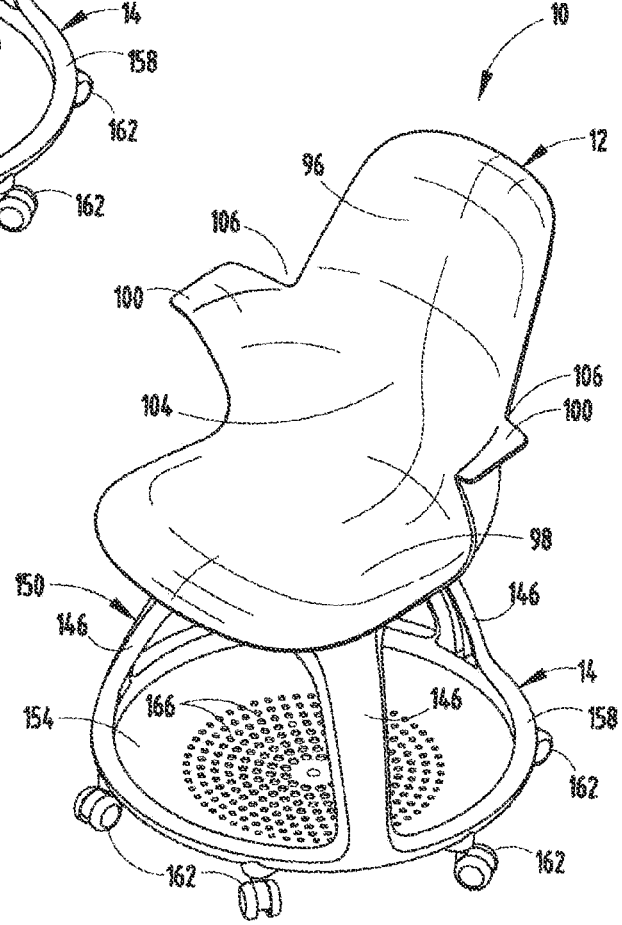
FIG. 2 is a perspective view of a seating unit in a second embodiment, the seating unit including a tripod base and no tablet assembly.
Figure 3:
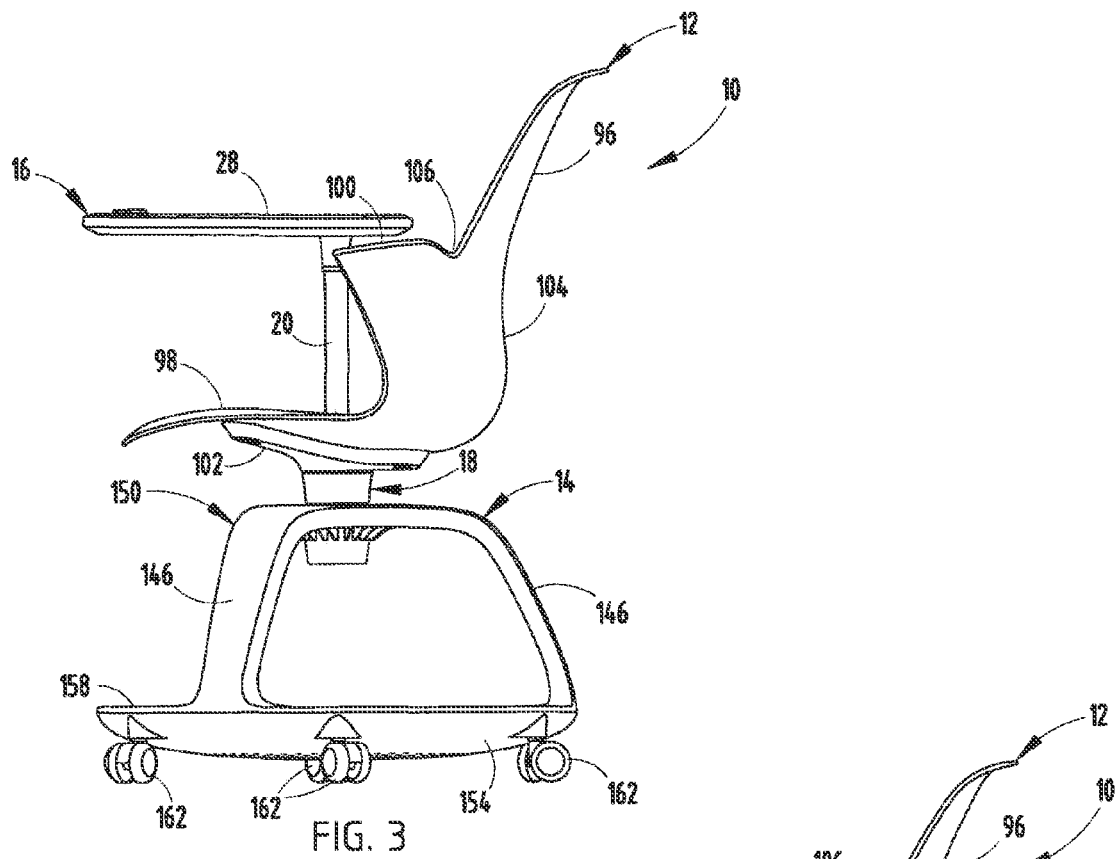
FIG. 3 is a right side view of the seating unit of FIG. 1.
Figure 4:
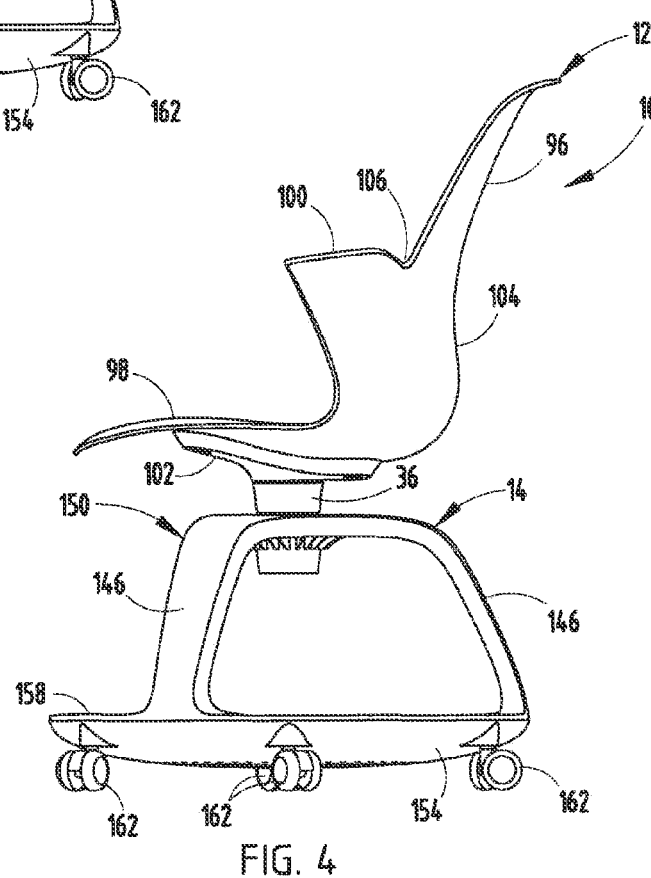
FIG. 4 is a right side view of the seating unit of FIG. 2.
Figure 5:
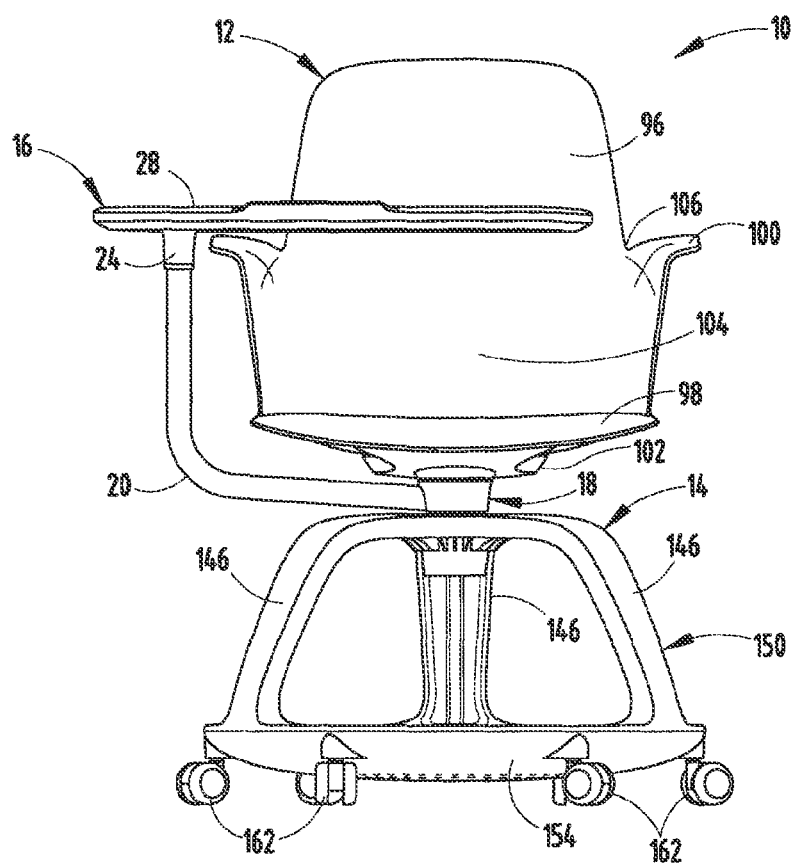
FIG. 5 is a front view of the seating unit of FIG. 1.
Figure 6:
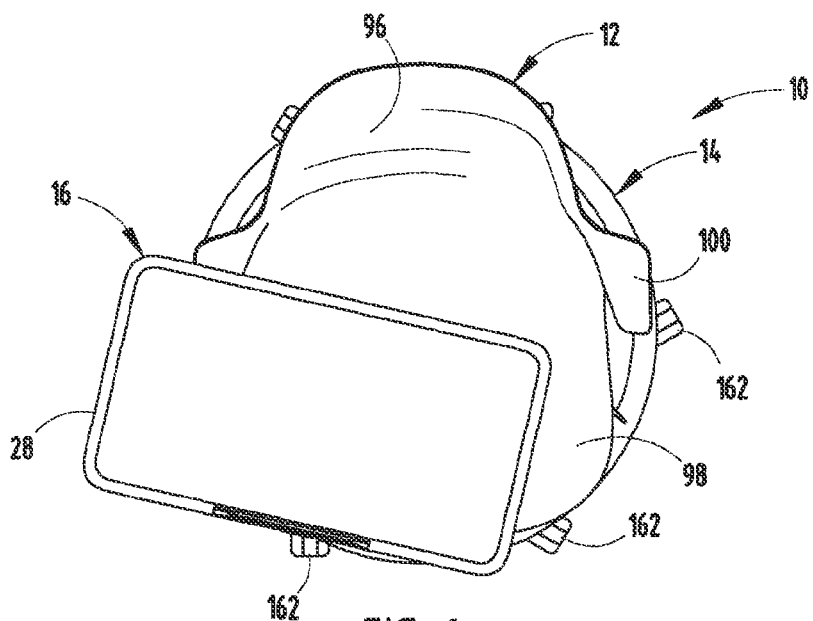
FIG. 6 is a top view of the seating unit of FIG. 1.
Figure 7:
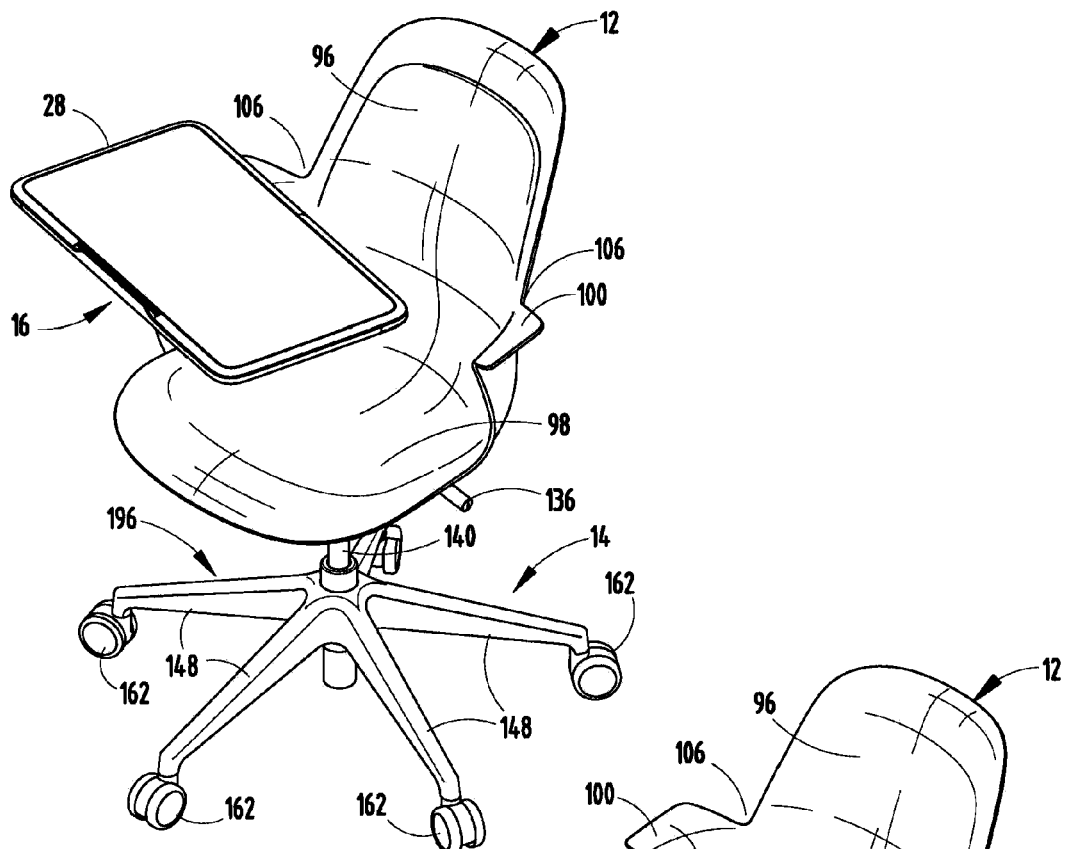
FIG. 7 is a perspective view of a seating unit in a third embodiment, the seating unit including a pedestal base and a tablet assembly.
Figure 8:
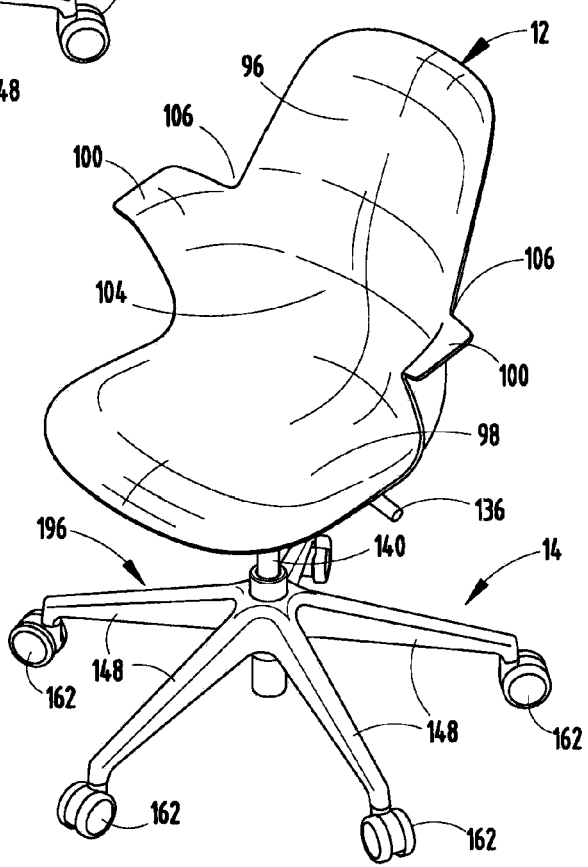
FIG. 8 is a perspective view of a seating unit in a fourth embodiment, the seating unit including a pedestal base and no tablet assembly.
Figure 9:
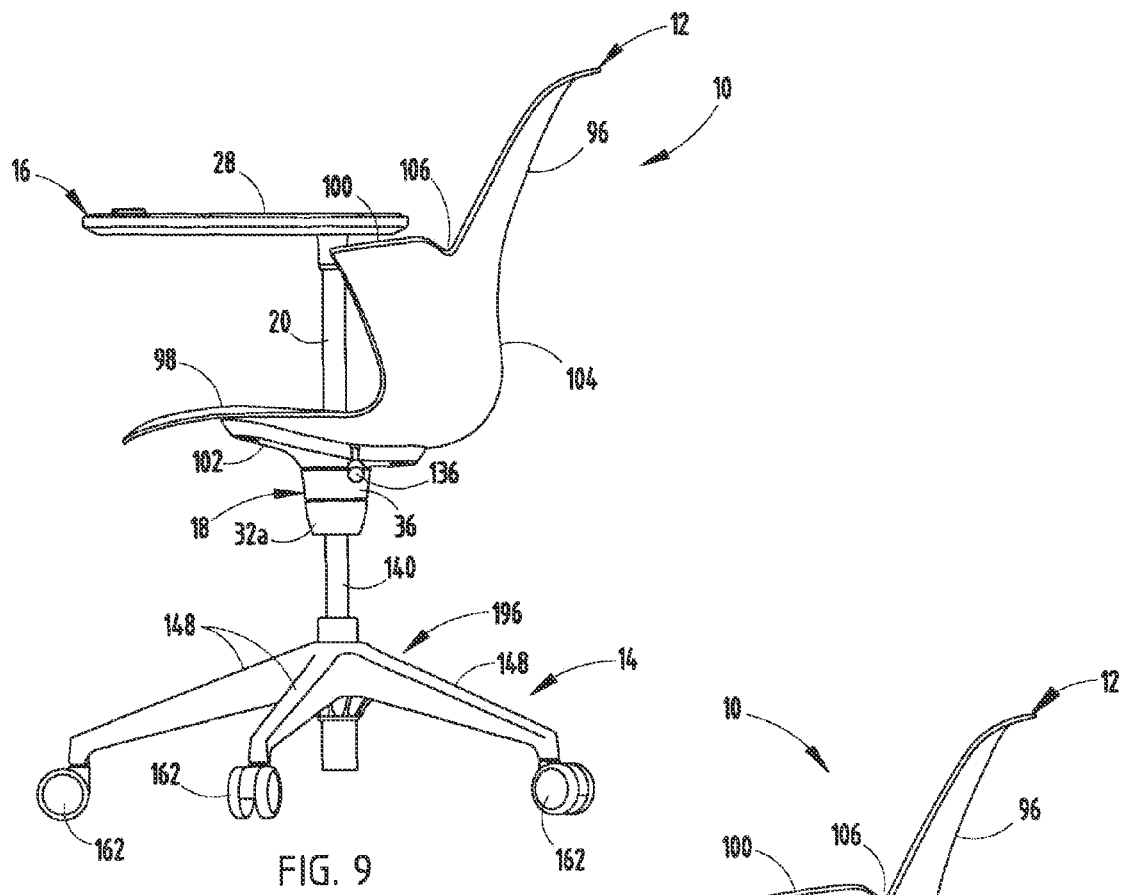
FIG. 9 is a right side view of the seating unit of FIG. 7.
Figure 10:
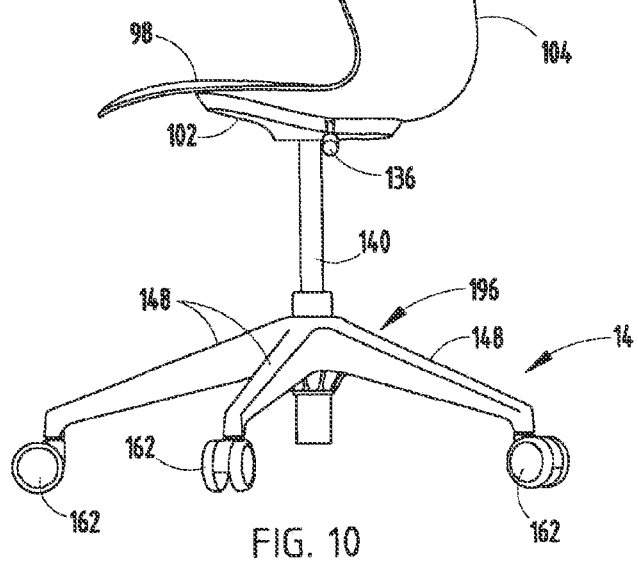
FIG. 10 is a right side view of the seating unit of FIG. 8.

For purposes of description herein, the terms "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices illustrated in the attached drawings, and described below are simply exemplary embodiments of the invented concepts. Hence, specific dimensions and other physical characteristics relating to the embodiments disclosed herein are not to be considered as limiting.

The present seating unit 10 includes a seat structure 12 and a base 14 (FIGS. 2, 4, 8 and 10). The seat structure 12 and base 14 are connected by a base to seat mounting assembly. The base to seat mounting assembly includes a base mounting assembly and a seat mounting bracket, both discussed in detail below. Optionally, the seating unit 10 may include a tablet assembly 16 (FIGS. 1, 3, 5-7 and 9). Referring to FIGS. 11-15, the tablet assembly 16 includes a tablet mounting assembly 18, a support arm 20 attached to the mounting assembly at a first end 22, a pivot assembly 24 engaging the support arm at a second end 26, and a tablet 28 attached to the pivot assembly. The mounting assembly 18 attaches to the seating unit 10 between and in-line with the seat structure 12 and base 14. Referring to FIGS. 13-15 and 27-30, the mounting assembly 18 includes a mounting collar 30 attached to the support arm first end 22, a bushing 32 or 32a press fit into a bottom 34 of the mounting collar, and a pivot cover 36 nested over a top 38 of the mounting collar and the support arm 20. The pivot cover 36 preferably is constructed of plastic material and includes a channel 40, a mousehole-shaped opening 42 and stop surfaces 44 and 46. The pivot cover 36 conceals stops and prevents pinch points when the stops engage. The mousehole-shaped opening 42 ensures that stop surfaces 44 and 46 contact the pivot cover 36 instead of the first end 22 of the support arm 20. Where the pivot cover 36 includes plastic, the mouse hole-shaped opening 42 replaces noisy metal-to-metal contact with a quieter metal-to-plastic contact condition.

Figure 20C:
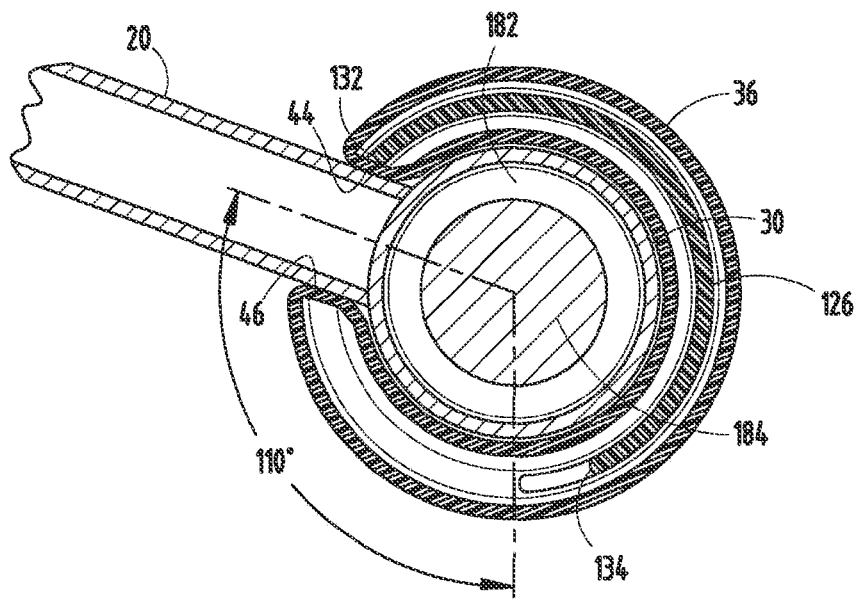
FIG. 20C is a cross-sectional view of the tablet mounting assembly of FIG. 20A and a seating mounting rib, showing tablet mounting assembly stops corresponding to the right side, fully outward position.
Figure 23C:
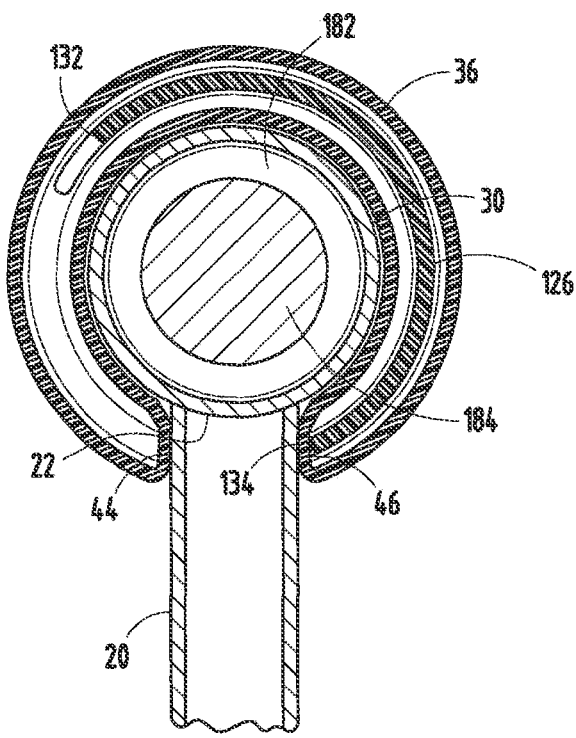
FIG. 23C is a cross-sectional view of the tablet mounting assembly and a seating mounting rib of FIG. 23A, showing tablet mounting assembly stops corresponding to the front, outward position.

The tablet assembly 16 may turn freely on the base 14 through 360 degrees of rotation. However, rotation of the support arm 20 is constrained relative to the seat structure 12 to prevent the tablet 28 from contacting the seat structure. The support arm 20 can rotate approximately 110 degrees relative to the seat structure 12. Specifically, movement of the support arm 20 relative to the seat structure 12 is restricted by stop surfaces 44 and 46 contacting stops on the seat structure. Rotation of the tablet assembly 16 relative to the seat structure 12 is illustrated in FIGS. 20C and 23C. Contact and friction between the tablet assembly 16 and the seat structure 12 are designed such that if a seated user swivels the seat structure relative to the base 14, but does not touch the tablet assembly 16, the tablet 28 will remain stationary relative to the base, until a stop is reached, at which point the tablet assembly will begin moving along with the seat structure. The stops prevent contact between the tablet assembly and the seat structure which may damage both over time.

The pivot assembly 24 connects the tablet 28 to the support arm 20 and allows the tablet to rotate horizontally on the second end 26 of the support arm. Referring to FIGS. 16-19, the pivot assembly 24 includes a tablet mount 48 secured to a bottom 50 of the tablet 28, a bushing 52 press fit into the second end 26 of the support arm 20, and an inner tube 54. The tablet mount 48 includes a connecting portion 56 having a central passage 58 and a depression 60. The depression 60 includes edges 62 and 64 which form stops. The bushing 52 includes a central throughbore 66, and a top annular flange 68. A top surface 70 of the annular flange 68 includes a rib 72 with bent ends 74 and 76 which form stop surfaces which restrict the relative motion of the tablet 28 on the support arm 20. Typically, rib 72 is made of a plastic material, so bent ends 74 and 76 replace hard, noisy metal-to-metal contact with a quieter metal-toplastic contact condition. The top flange 68 also includes a cutout 78 positioned parallel to the rib 72. The second end 26 of the support arm 20 includes a projection 80 corresponding to the cutout 78. The shapes of the rib 72, cutout 78 and projection 80 correspond to each other and may be linear, angled or arcuate. However, in a preferred embodiment, the shapes of the rib 72, cutout 78 and projection 80 are arcuate.

To assemble the pivot assembly 24, the bushing 52 is press fit into the second end 26 of the support arm 20 with the projection 80 passing through the cutout 78 such that the rib 72 and projection are adjacent to each other. A lower end 82 of the inner tube 54 is inserted and secured in the bushing throughbore 66, and an upper end 84 of the inner tube 54 is inserted and secured in the tablet mount passage 58. When the inner tube 54 is inserted into the passage 58 of the tablet mount connecting portion 56, the top surface 70 of the annular flange 68 abuts a bottom 86 of the connecting portion and the rib 72 and projection 80 reside in the depression 60. When assembled, the bottom 86 of the connecting portion 56 and the annular flange 68 work together to conceal the stops where edge 64 contacts bent end 76 and edge 62 contacts bent end 74, thereby preventing pinch points.

Rotation of the tablet 28 relative to the support arm 20 is illustrated in FIGS. 20A and B through 25A and B. Horizontal rotation of the tablet 28 is restricted to prevent the tablet 28 from contacting the seat structure 12, to allow a user to comfortably sit on and exit from the chair, and to ensure adequate stability of the seating unit 10. Regarding stability, horizontal outward rotation of the tablet 28 is restricted to prevent tipping of the chair. When the tablet 28 is rotated outward and an object is placed on the tablet, the weight of the object, $W_{obj}$, produces a moment, $M_{obj}$, that can tip the seating unit 10 over if the center of the tablet extends beyond the base of the seating unit. The value of moment $M_{obj}$ is equal to the weight of the object, $W_{obj}$, multiplied by the shortest horizontal distance, $L_{obj}$, between the center of the weight, $W_{obj}$, and the axis of rotation, where the axis of rotation is a line drawn through the centerlines of two casters 162 nearest to the object. For the seating unit 10 to be stable, $M_{obj}$ must be less than or equal to a counterbalancing moment, $M_{su}$, formed by the weight of the seating unit, $W_{su}$, multiplied by the shortest horizontal distance $L_{su}$ from the seating unit's center of mass to the axis of rotation. This is expressed mathematically as $M_{obj} \leq M_{su}$ or $(W_{obj}*L_{obj}) \leq (W_{su}*L_{su})$. In a preferred embodiment, maximum outward rotation of the tablet 28 relative to the support arm 20 is restricted to an angle where the tablet 28 does not tip when an object weighing up to 25 pounds is placed onto the center of the tablet (Le., $W_{obj} \leq 25$ pounds). Specifically, maximum outward rotation of the tablet 28 is restricted to approximately 60 degrees by bent end 74 contacting edge 62 (FIGS. 20A, 20B, 23A, 23B) to prevent the seating unit 10 from tipping. Also, in a preferred embodiment, maximum inward rotation of the tablet 28 relative to the support arm 20 is restricted to approximately 60 degrees by bent edge 76 contacting edge 64 (FIGS. 22A, 22B, 25A, 25B to prevent the tablet from contacting the seat structure 12.

Figure 18:
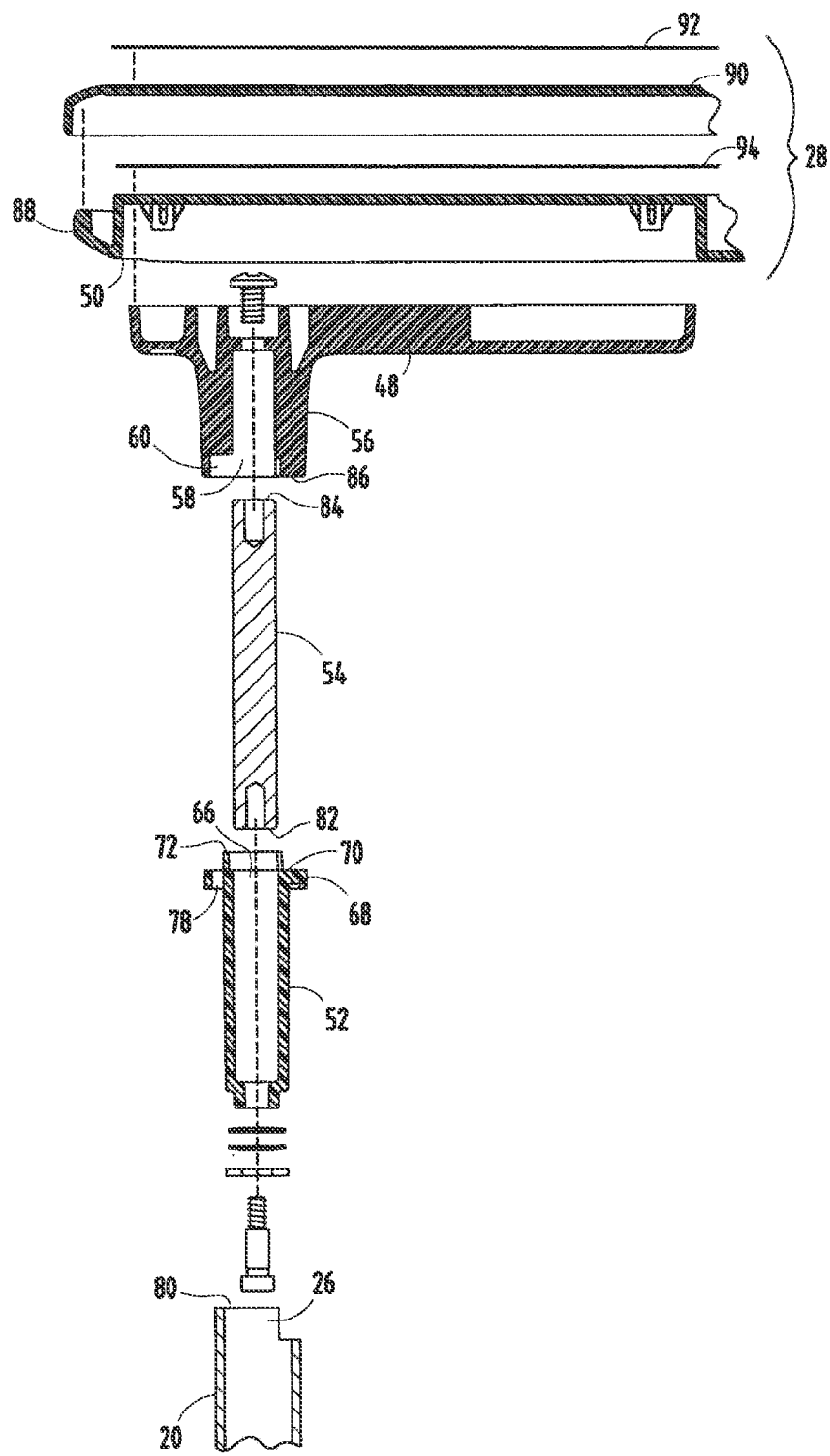
FIG. 18 is an exploded cross-sectional view of the tablet assembly of FIGS. 1 and 7.
Figure 19:
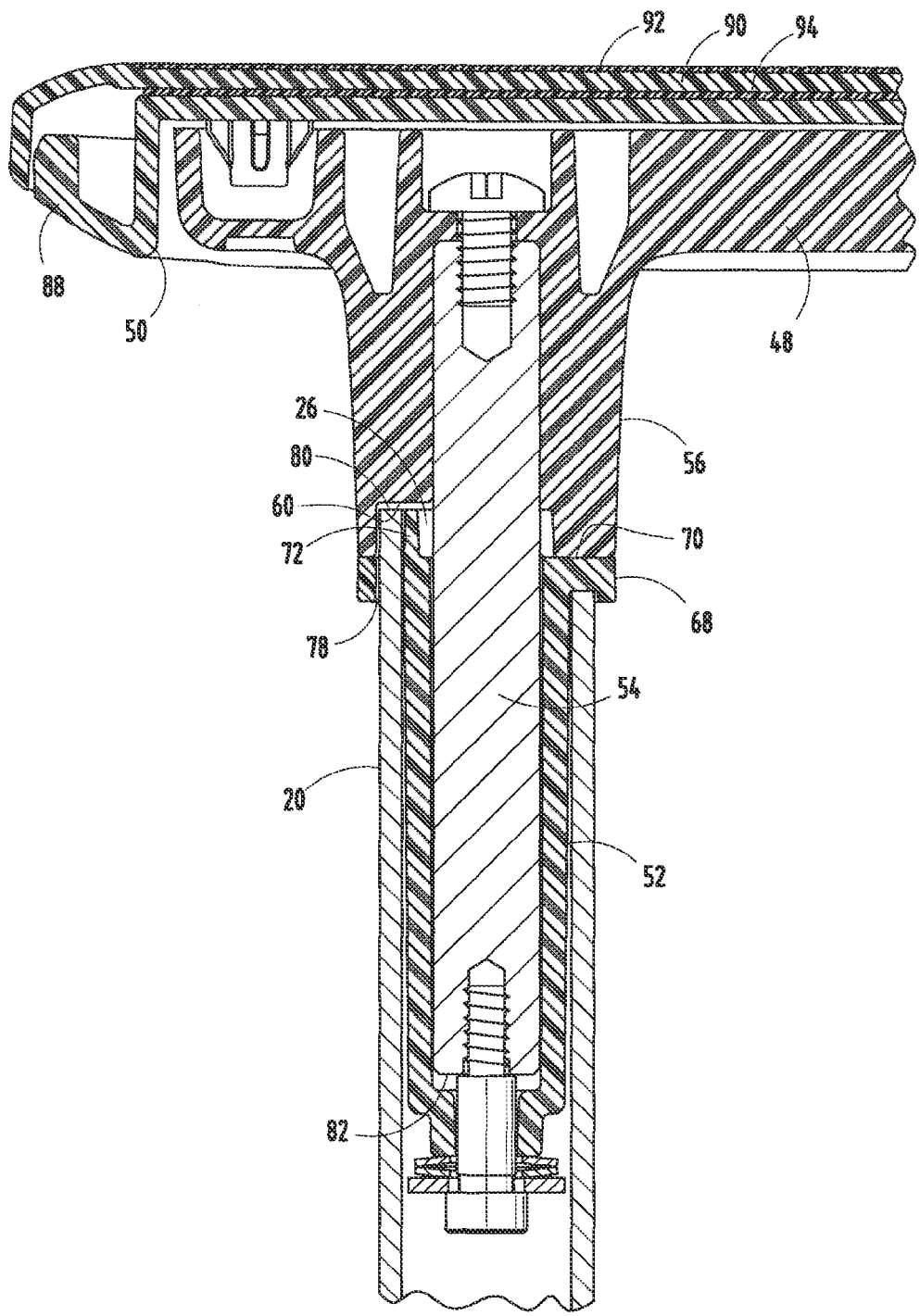
FIG. 19 is a cross-sectional view of the tablet assembly of FIGS. 1 and 7.

The tablet 28 is illustrated in FIG. 18 and includes a tray base 88 attached to the tablet mount 48 and a skin 90 attached to the tray base. The tray base 88 is typically constructed of a strong structural material such as glass-filled nylon. The skin 90 can be molded from a wide variety of materials, such as acrylonitrile butadiene styrene (A8S) or other plastic materials. Optionally, an insert 92 may be molded into the skin 90. Suitable inserts 92 may be constructed of a high pressure laminate (HPL) or thermoplastic polyurethane (TPU). To prevent rattling and to dampen sound resonating through the tray base 88, an intermediate layer 94 may be positioned between the tray base and skin 90. Typically, the intermediate layer 94 includes a nonwoven sheet. A thin layer of soft cellular foam or damping foil may also be used as the intermediate layer.

The seat structure 12 rotates freely on the base 14 through 360 degrees of rotation and includes a backrest 96, a seat 98, armrests 100 and a seat mounting bracket 102 (FIGS. 12, 13, 26 and 28). Typically, the backrest, seat and armrests are formed as a one-piece shell. Alternatively, the backrest, seat and armrests may be separate. The backrest and seat may also include upholstery. The armrests 100 extend upwardly and outwardly from a lower portion 104 of the backrest 96 to form a valley 106 between the armrest and the backrest. A backpack, purse, bag, or other article having a strap can be hung on an armrest 100 by placing the strap into the valley 106 and around the armrest. The article supported by the armrest is available for easy access by a seated user.

Figure 12:
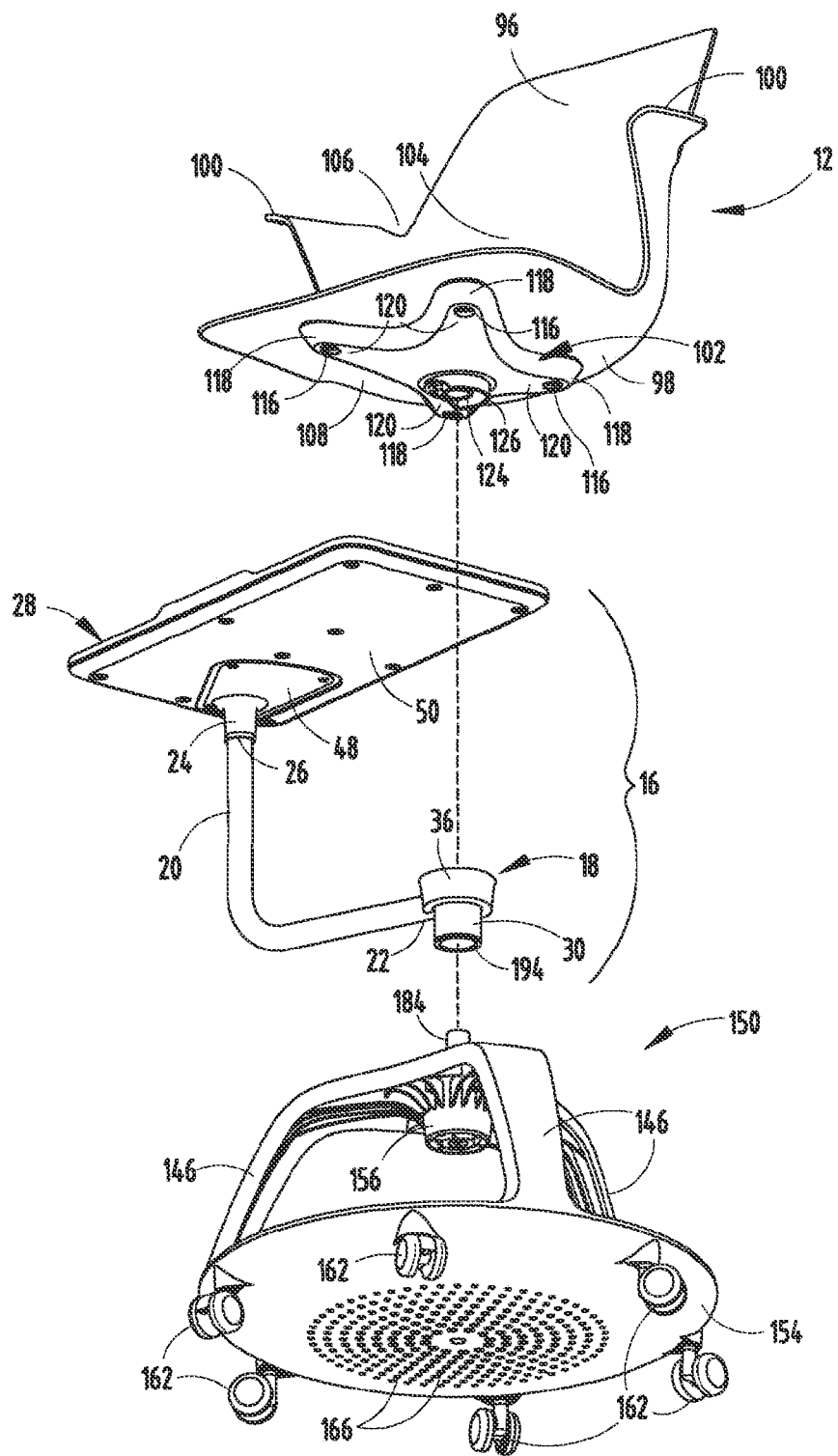
FIG. 12 is an exploded bottom perspective view of the seating unit of FIG.
Figure 13:
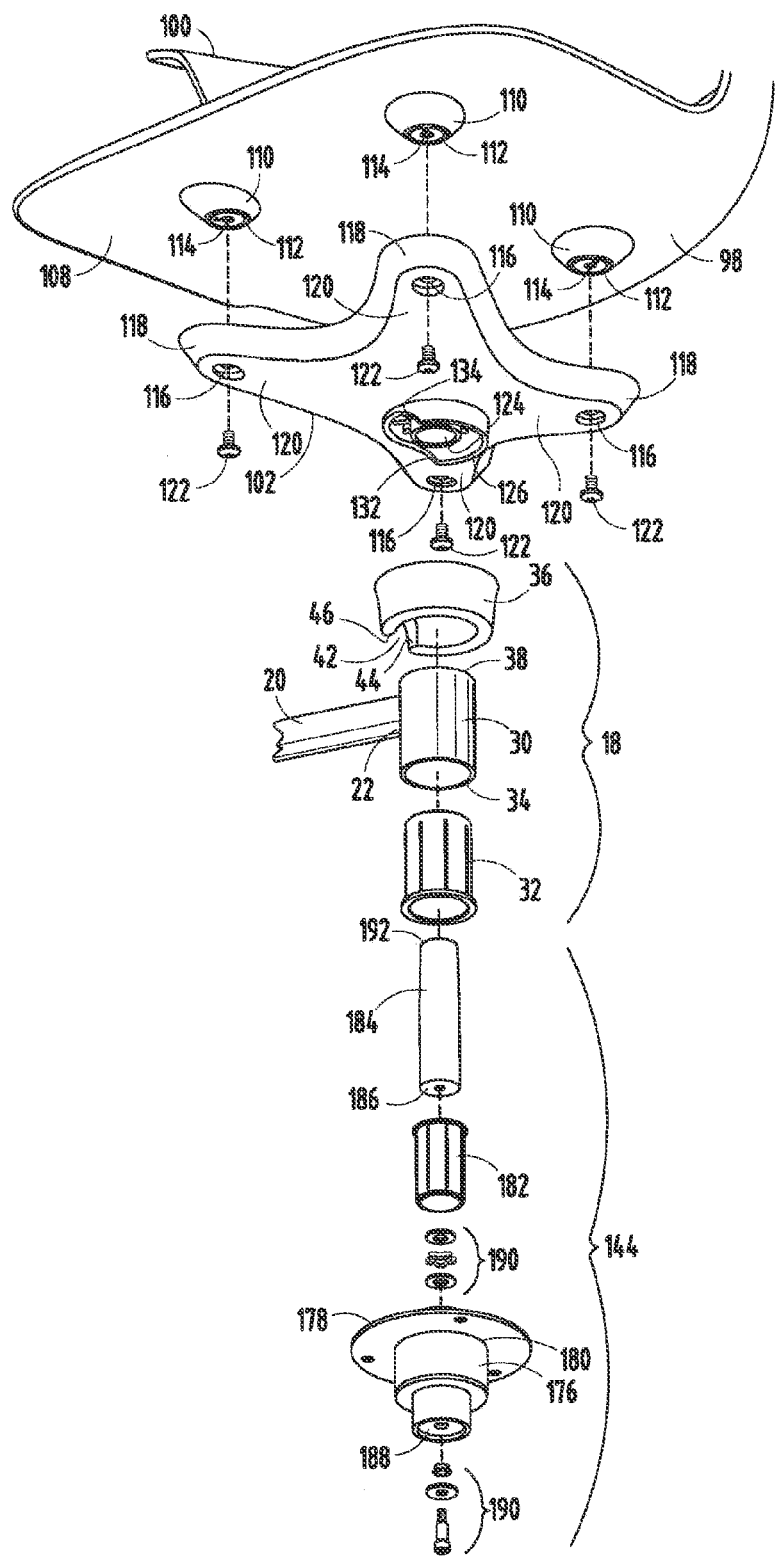
FIG. 13 is an exploded view of a base to seat mounting assembly of the seating unit of FIG. 1.
Figure 26:
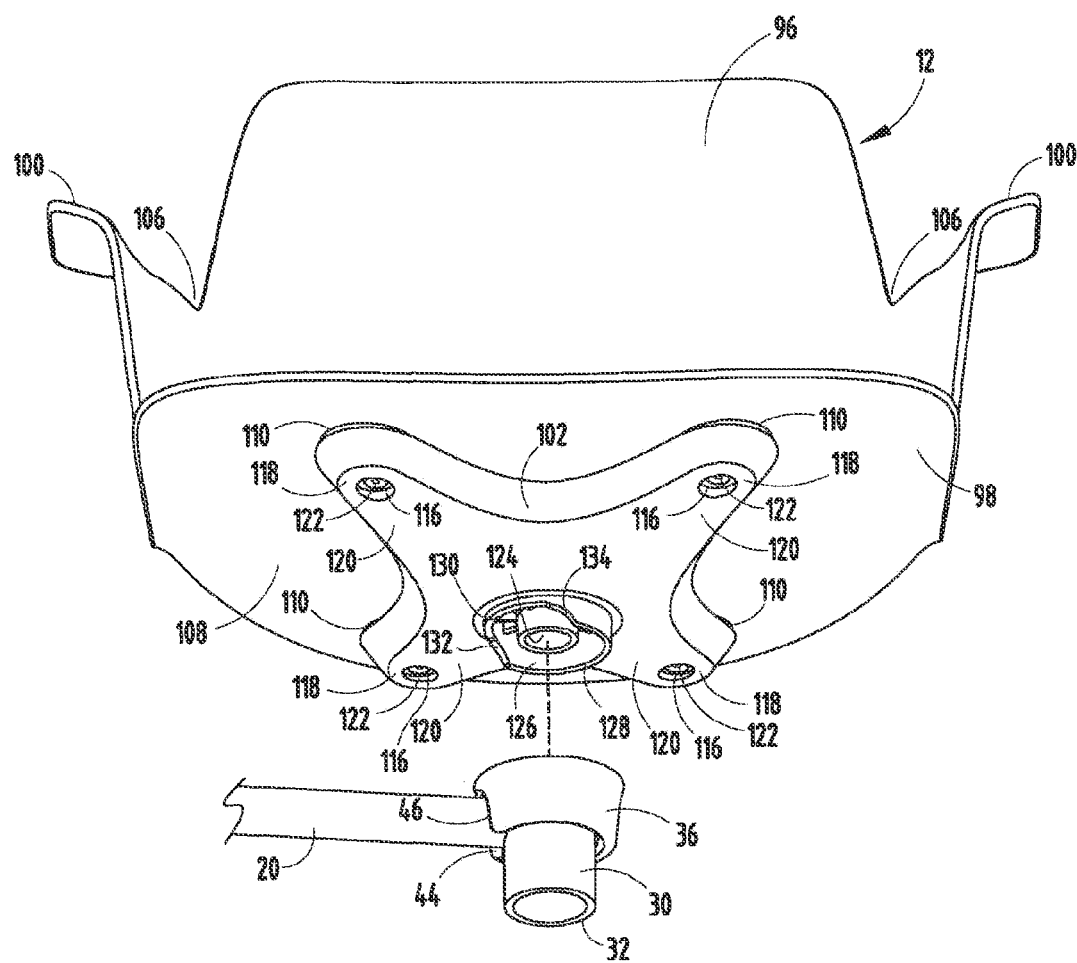
FIG. 26 is a bottom perspective view of a seating structure and tablet mounting assembly of FIGS. 1 and 7.
Figure 27:
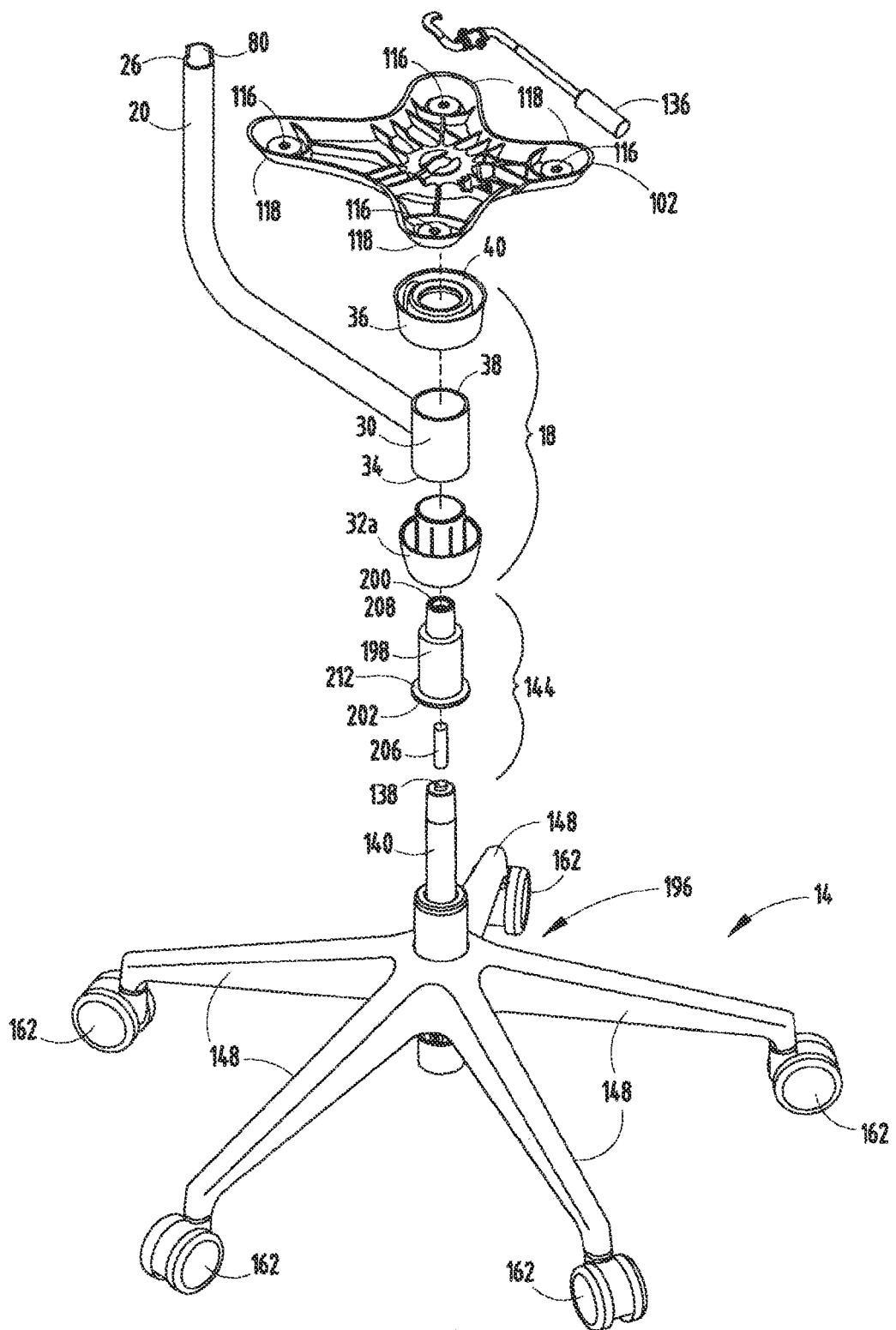
FIG. 27 is an exploded view of a pedestal base and base to seat mounting assembly of the seating unit of FIG. 7.
Figure 28:
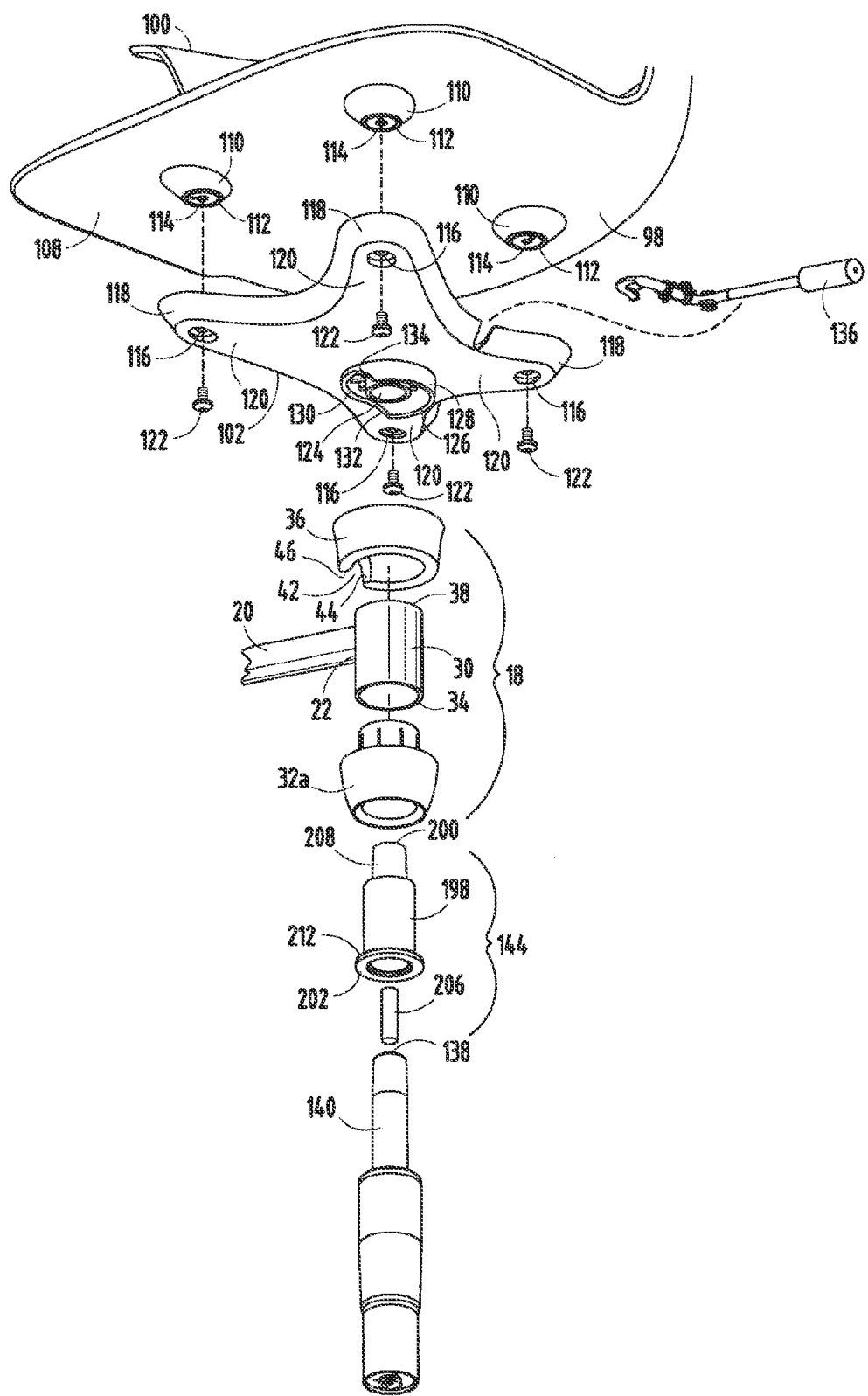
FIG. 28 is an exploded view of the base to seat mounting assembly and seat structure of the seating unit of FIG. 7.
Figure 29:
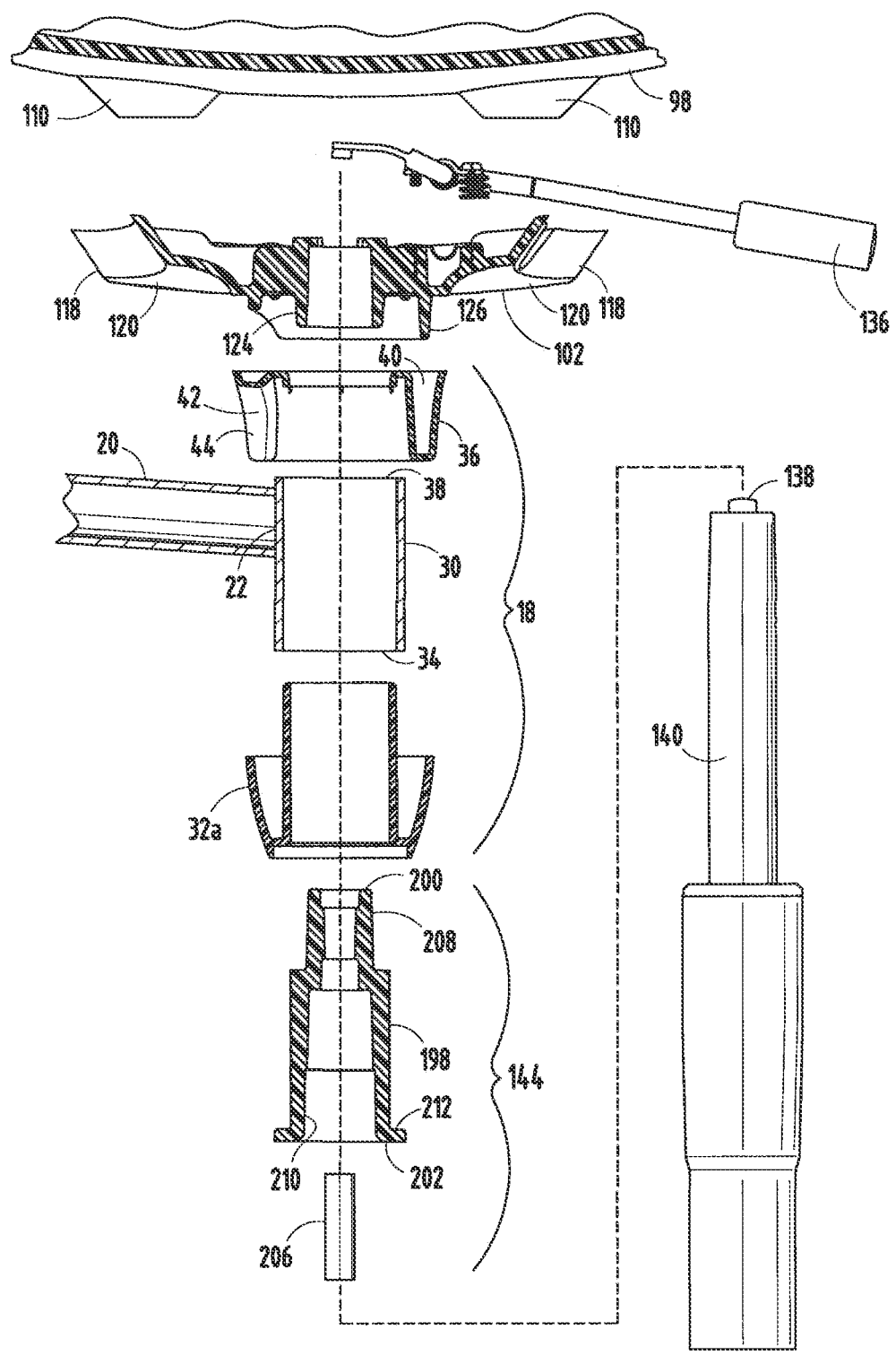
FIG. 29 is an exploded cross-sectional view of the base to seat mounting assembly of the seating unit of FIG. 28.

Referring to FIGS. 13 and 28, an underside 108 of the seat 98 includes multiple protrusions 110 molded into and integral with the seat. The protrusions 110 include an over-molded boss insert 112 having a central aperture 114. Although the seat 98 may include any number of protrusions 110, preferably, there are four protrusions. Attached to protrusions 110 is the mounting bracket 102 for connecting the seat structure 12 to the base 14 and optionally to a tablet assembly 16. The mounting bracket 102 can be any shape, but preferably the bracket is X-shaped and includes an aperture 116 near an end 118 of each leg 120 of the X. The mounting bracket 102 can be attached to the seat 98 by passing a fastener 122 through the aperture 116 in the leg 120 and into a corresponding aperture 114 in a protrusion 110. Alternatively, the mounting bracket 102 may be attached to the seat 98 using an adhesive or rivets. The mounting bracket 102 also includes a central female connector 124 and an annular rib 126 surrounding the female connector. As illustrated in FIGS. 12, 13 and 26, the height of the annular rib 126 is not uniform, but rather includes a first portion 128 having a greater height than a second portion 130. The first and second portions 128, 130 are connected by angled portions 132 and 134. Angled portions 132, 134 form stop surfaces which restrict movement of the tablet assembly 16 relative to the seat structure 12. In particular, movement of the support arm 20 toward the rear of the seat structure 12 is restricted by stop surface 44 contacting angled portion 132. Likewise, movement of the support arm 20 toward the front of the seating structure 12 is restricted by stop surface 46 contacting angled portion 134. (See FIGS. 20C and 23C). Referring to FIGS. 9, 10 and 27-30, for a seating unit 10 including a pedestal base, the mounting bracket 102 may also include a lever 136. The lever 136 is used to activate an actuator button 138 of a vertically adjustable gas cylinder 140.

Figure 11:
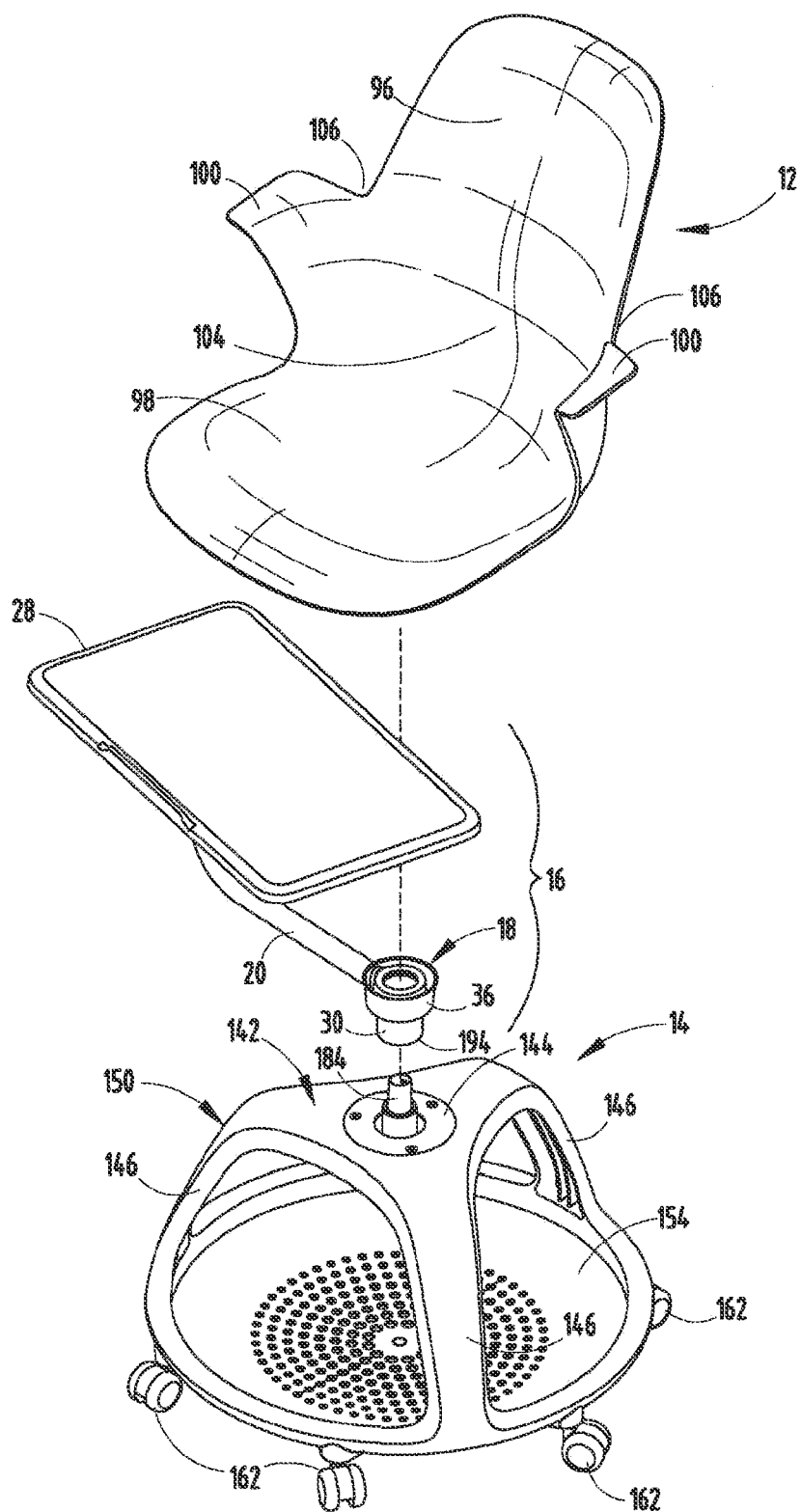
FIG. 11 is an exploded top perspective view of the seating unit of FIG. 1.

The base 14 includes a base support 142 and a base mounting assembly 144 (FIG. 11). As illustrated in FIGS. 1-6, 11, 12 and 31-34, the base support 142 may have three or more legs 146. In an alternative embodiment, the base support may include a pedestal with radially extending legs 148, such as a five-star pedestal (FIGS. 7-10 and 27-30).

Figure 31:
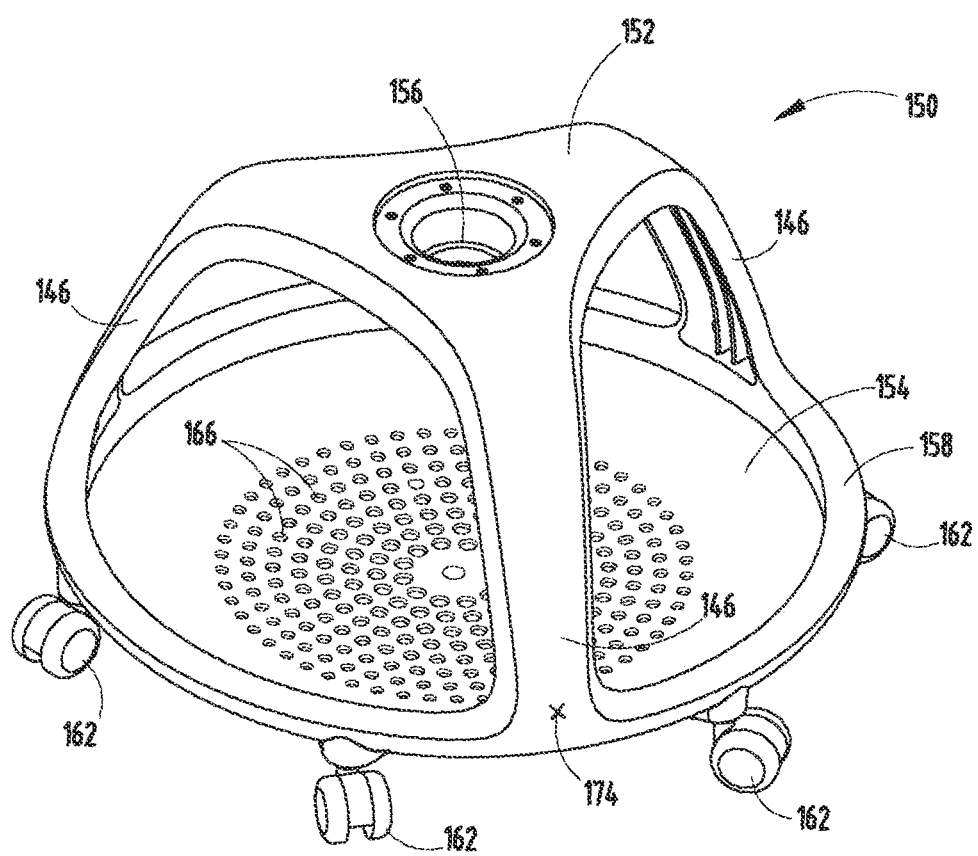
FIG. 31 is a perspective view of a base of the seating unit of FIGS. 1-6.
Figure 32:
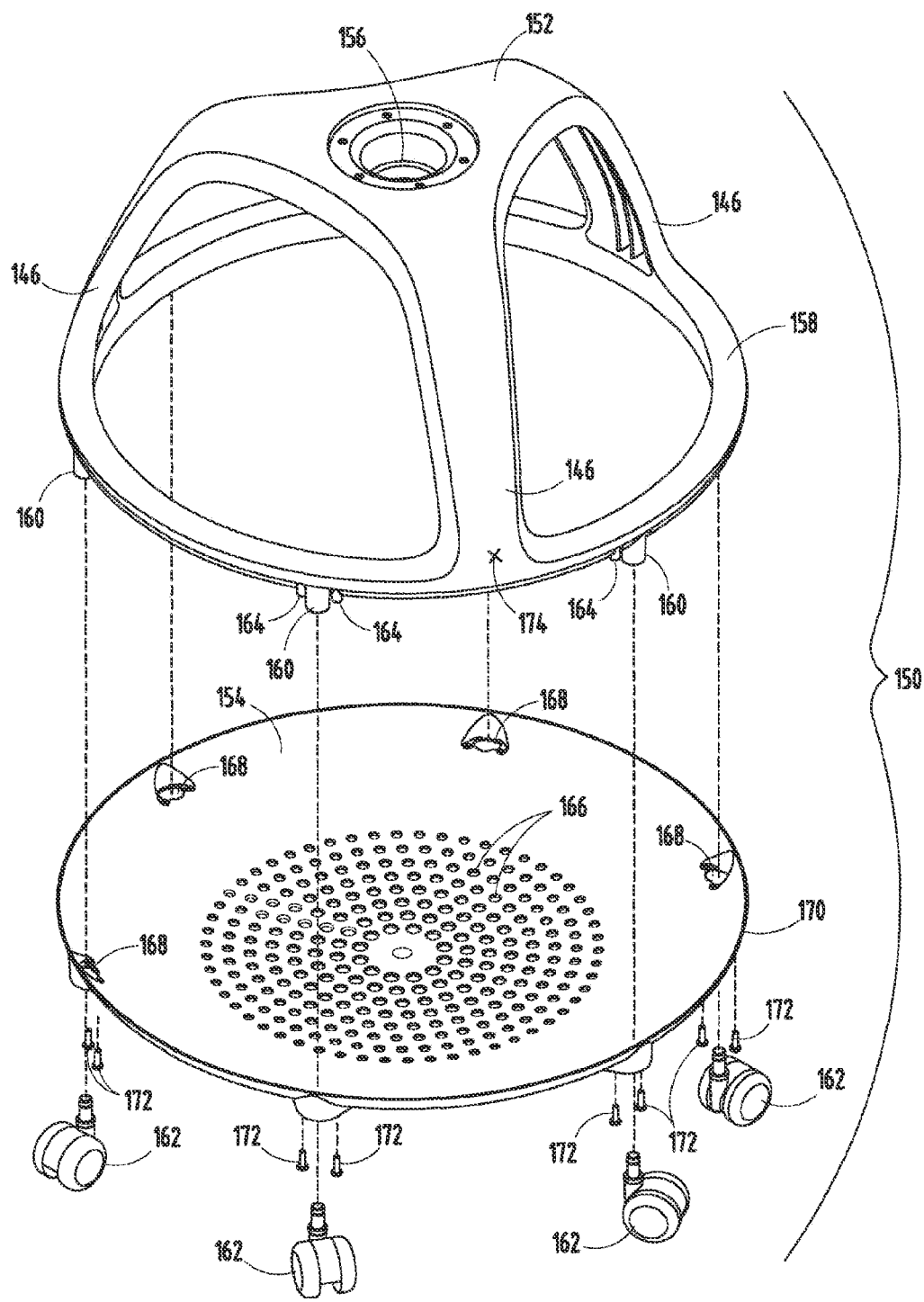
FIG. 32 is an exploded perspective view of the base of FIG. 31.
Figure 33:
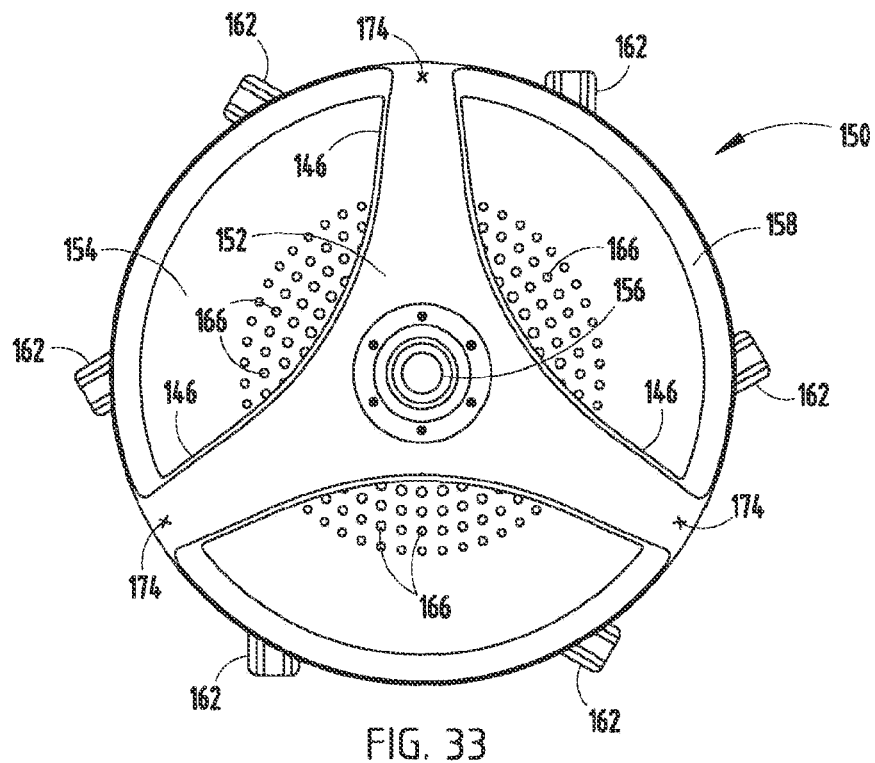
FIG. 33 is a top view of the base of FIG. 31.
Figure 34:
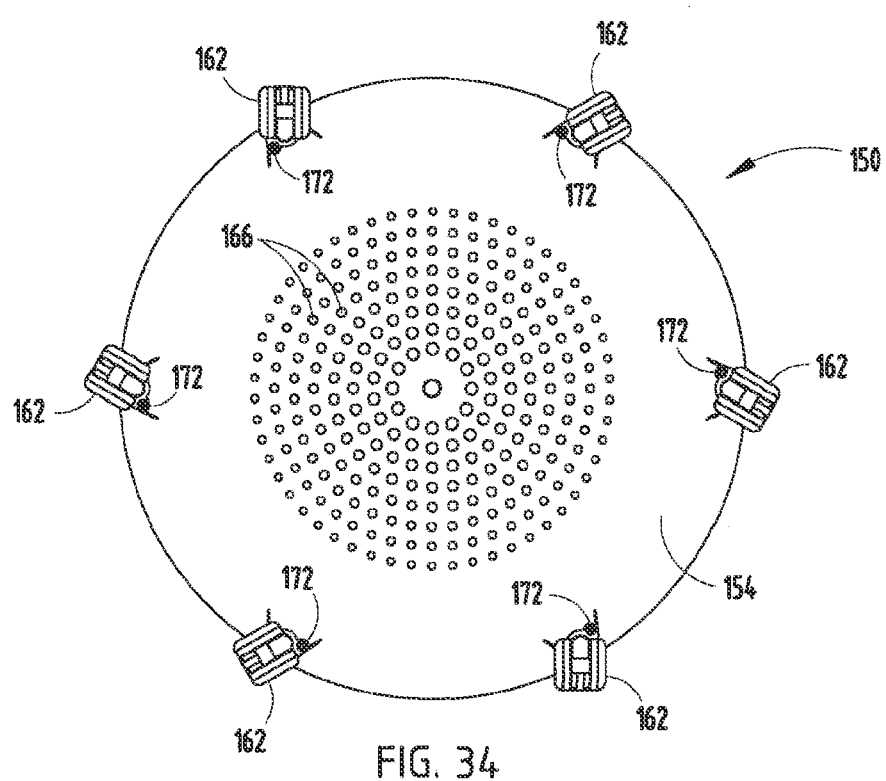
FIG. 34 is a bottom view of the base of FIG. 31.

Referring to FIGS. 31 and 32, in one embodiment, the seating unit 10 includes a base 14 having a tripod base support 150. The tripod base support 150 includes a top 152 attached to a bottom pan 154. The pan 154 can be used to store a backpack, purse, bag, or other article. The top 152 includes three curved legs 146 extending from a central hub 156 and attached to a bottom ring 158. A seated user can also use the pan 154 or bottom ring 158 as a footrest. Preferably, the bottom ring 158 is attached to legs 146 to minimize cost and maximize structural integrity of base 150. However, in an alternative embodiment, the bottom ring 158 may be attached to the bottom pan 154. The bottom ring 158 includes a plurality of pintle mounts 160 for mounting casters 162 or glides. In a preferred embodiment, the legs 146 and pintle mounts 160 are positioned equidistantly around the bottom ring 158 (see FIGS. 33 and 34). Flanking the pintle mounts 160 are fastening bosses 164. The bottom pan 154 can be any shape, but preferably is circular. The pan 154 typically includes a series of holes 166. The series of holes 166 permits air flow through the pan 154 and allows liquids from stored articles or shoes which may accumulate to drain. Typically, the series of holes 166 is arranged in a circular pattern of small holes, however, any other pattern or hole size can be used. The bottom pan 154 also includes a plurality of apertures 168 located equidistantly adjacent a periphery 170 of the pan. The plurality of apertures 168 includes a central opening with a smaller hole on each side of the central opening. The position of the apertures 168 corresponds to the position of the pintle mounts 160 and fastening bosses 164. To assemble the base 14 including a tripod base support 150, the top 152 is positioned over the bottom pan 154 with the pintle mounts 160 extending through the central hole of apertures 168. Fasteners 172 pass through the two smaller holes of apertures 168 and engage the fastening bosses 164 to secure the pan to the top 152. Optionally, the top 152 and bottom pan 154 may include clips (not shown) positioned between pintle mounts 160 and casters 162, respectively. The top clips are releasably engaged to the bottom clips. The clips help maintain contact between the top 152 and bottom pan 152 and prevent gaps between them. Casters 162 or glides are inserted into the pintle mounts 160. As the seating unit 10 moves around, articles stored on the pan 154 remain with the seating unit and are available for access by a seated user.

Typically, the tripod base support 150 includes six pintle mounts 160 and casters 162, although more pintle mounts and casters can be used. As noted above, in a preferred embodiment, the pintle mounts 160 and legs 146 are positioned equidistantly around the bottom ring 158 of the top 152. When the tripod base support 150 includes six pintle mounts 160, each pintle mount is positioned approximately 60 degrees from adjacent mounts and each leg 146 is positioned approximately 120 degrees from adjacent legs. To maximize stability of the seating unit 10 and minimize deflection of the base pan 154, the pintle mounts 160 and casters 162 are offset from the legs 146. It has been discovered that when at least some of the pintle mounts 160 and casters 162 line up with the legs 146, the structural integrity of the base 150 and the stability of the seating unit 10 is compromised. Specifically, where the pintle mounts 160 and casters 162 are in-line with the legs 146, a user sitting on the seating unit 10 applies a load which is transferred to the casters below the legs. However, almost no load is transferred to the remaining casters. An uneven load distribution can cause pintles and casters to break. Also, the in-line configuration may also compromise the stability of the seating unit and create potential safety issues for a seated user. For example, if a user turns the seating unit 10 such that one of the legs 146 faces straight forward and an open section faces backward, and then leans back, the user can rock with the seating unit pivoting on the two rear legs. The rear portions of the pan 154 and bottom ring 158 flex excessively and the front casters 162 lift off the ground, causing the seated user to tip backwards. Offset casters 162 and legs 146 address both of these issues by distributing loads and stresses evenly among all casters and reducing the ability of a user to flex the pan 154 and bottom ring 158 when leaning backwards. This is true whether the pintle mounts 160 and casters 162 are positioned equidistantly around the bottom ring 158 or not. However, it has been discovered that preferably the number of casters 162 is 2x, where x is the number of legs 146, and the distance between a midpoint 174 of where the leg attaches to the bottom ring 158 (Le., half the width, W, of the bottom of the leg) and adjacent casters is $\pi D/4x$, where D is the diameter of the pan 154. In other words, the distance from an edge of a leg 146 to the nearest adjacent caster is $\pi D/4x - W/2$.

Figure 14:
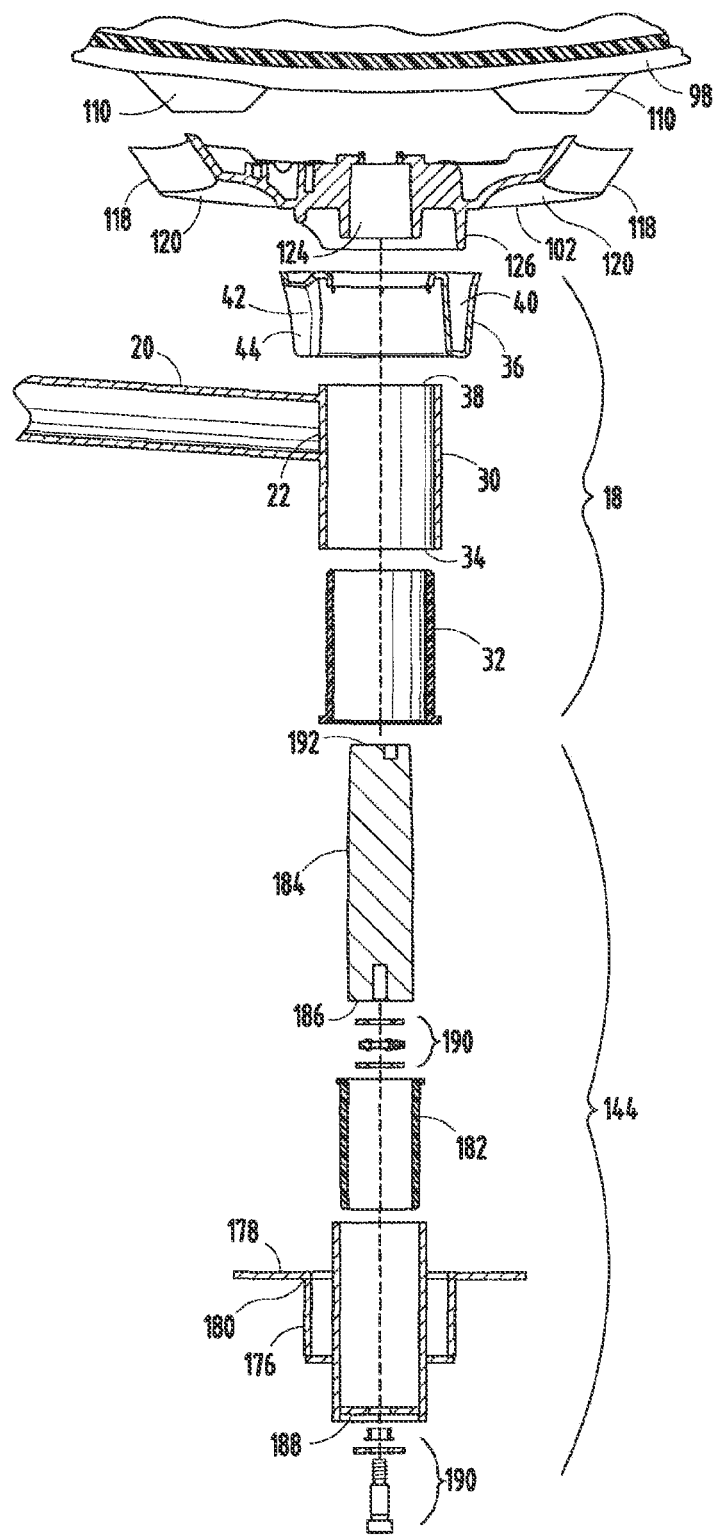
FIG. 14 is an exploded cross-sectional view of the base to seat mounting assembly of FIG. 13.
Figure 15:
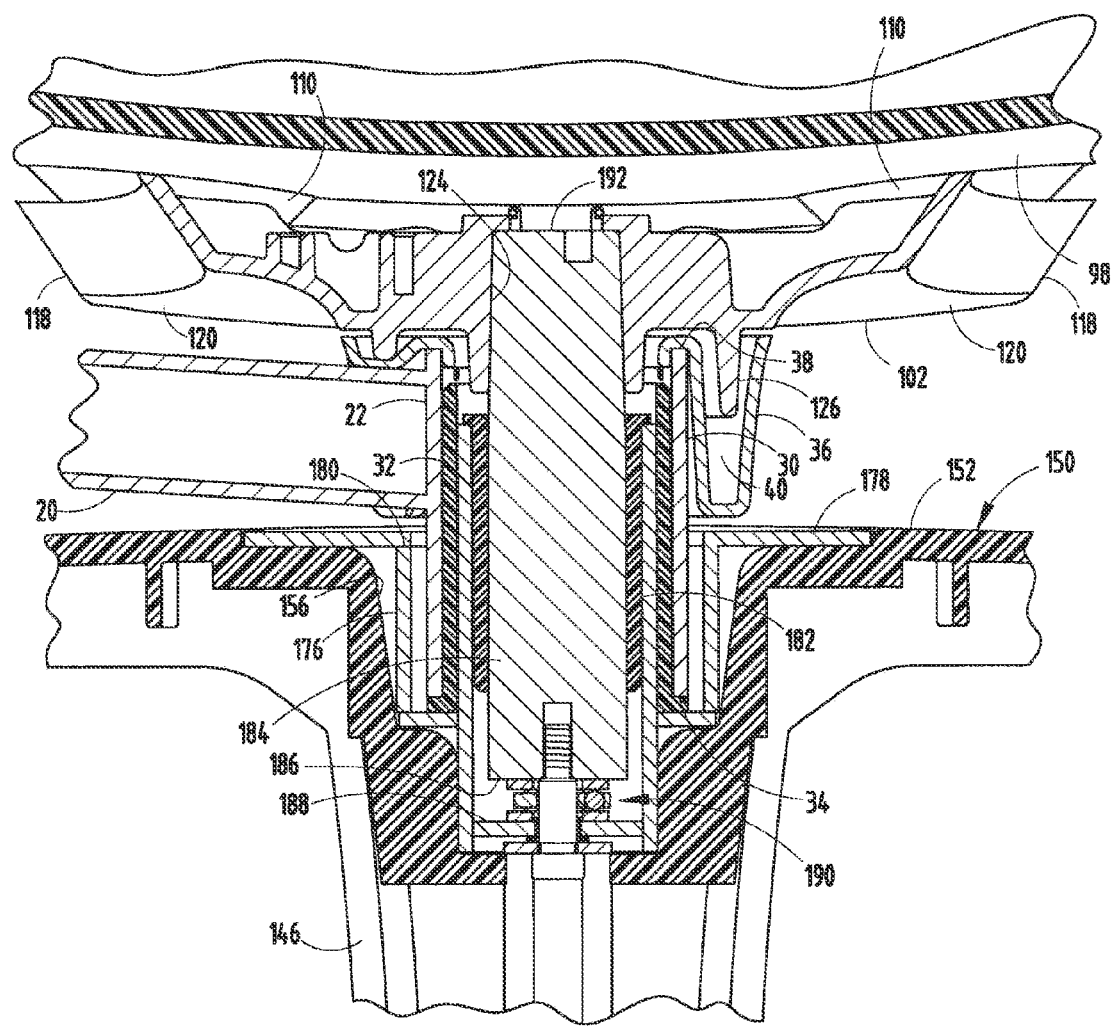

The base mounting assembly 144 components vary depending on the type of base support. The base mounting assembly 144 for a tripod base support 150 is illustrated in FIGS. 13-15. In this embodiment, the base mounting assembly 144 includes a cup 176 with a flange 178 at a top end 180, a bushing 182 press fit into the cup, and a base tube 184. The cup 176 is inserted into the central hub 156 and the flange 178 is secured to the base top 152. A bottom end 186 of the base tube 184 is inserted through the bushing 182 and into the cup 176. The bushing 182 and bottom end 186 of the base tube 184 are secured to a bottom 188 of the cup 176 with a fastener and a series of washers and thrust bearings 190. Typically, the fastener is a mechanical fastener such as a shoulder bolt.

Referring to FIG. 15, to assemble the seating unit 10 including a base 14 having a tripod base support 150 and a tablet assembly 16, a top end 192 of the base tube 184 is inserted through the tablet mounting assembly 18 and mateably engages the female connector 124 of the seat mounting bracket 102. In this configuration, a bottom portion 194 of the tablet mounting assembly 18 resides in the base cup 176, and the annular rib 126 of the seat mounting bracket 102 resides in the channel 40 of the tablet mounting assembly pivot cover 36.

Referring to FIGS. 7-10, in an alternative embodiment, the seating unit 10 includes a base 14 having a pedestal base support 196. One example of a suitable pedestal base support is a five-star pedestal base support having a vertically adjustable gas cylinder 140 and radially extending legs 148. Typically, the gas cylinder 140 is tapered and includes a top activated actuator button 138. The base mounting assembly 144 for a pedestal base support 196 including a tapered gas cylinder 140 is illustrated in FIGS. 27-30. In this embodiment, the base mounting assembly 144 includes a receiver 198 having a top 200 and a bottom 202, and a button extender 206. The receiver 198 is generally cylindrical and includes a tapered male connector 208 at the top 200. The receiver 198 also includes an internal taper 210 and an outer flange 212 at the bottom 202. The tapered gas cylinder 140 is accepted into the internal taper 210 and the button extender 206 is inserted into the male connector 208.

Figure 30:
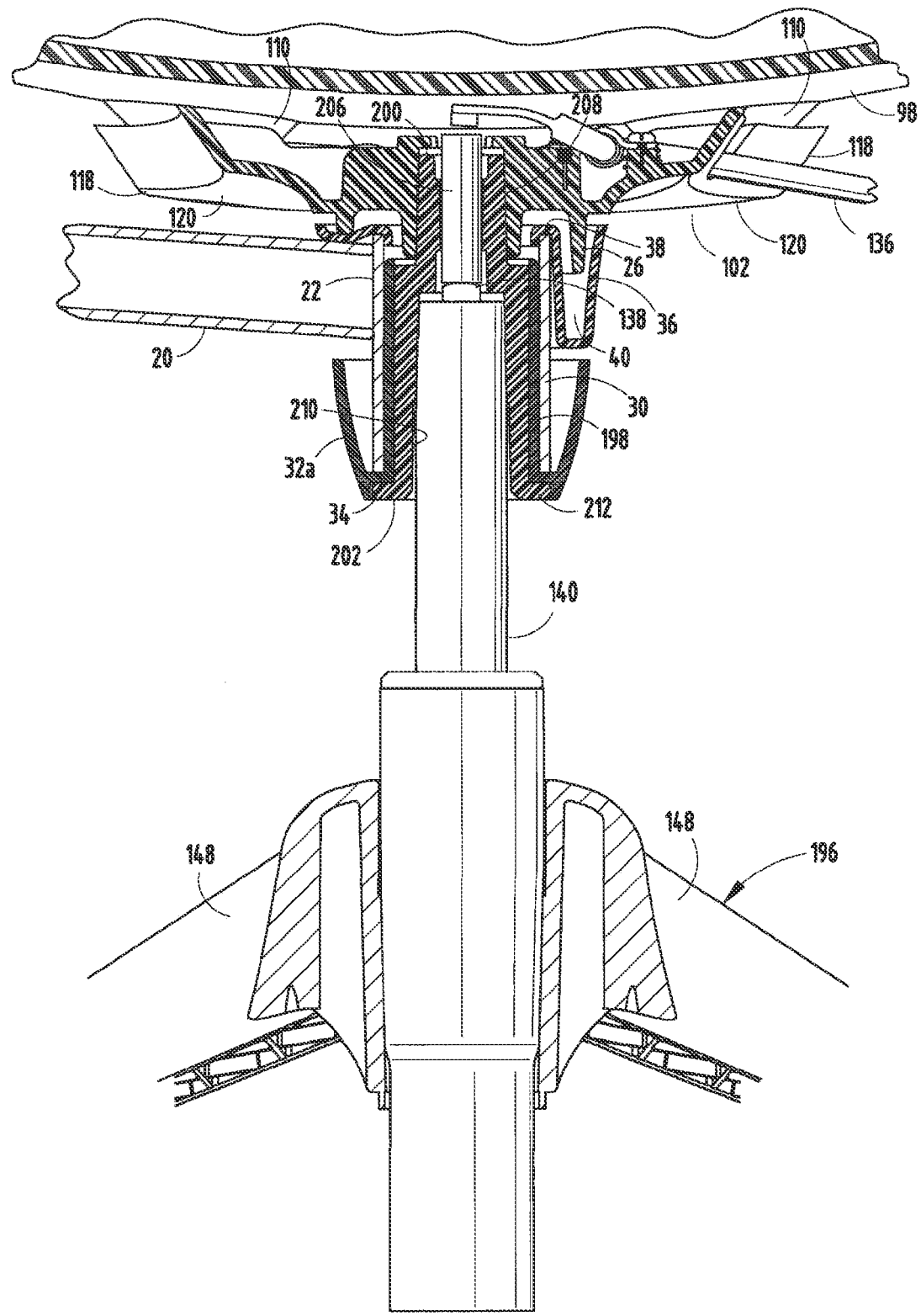
FIG. 30 is a cross-sectional view of the base to seat mounting assembly of the seating unit of FIG. 7.

Referring to FIG. 30, to assemble the seating unit 10 including a pedestal base support 196 and a tablet assembly 16, receiver 198 of the base mounting assembly is inserted into the bushing 32a of the tablet assembly 16 such that the bottom 34 of the mounting collar is supported by the receiver flange 212 and bushing, and the receiver extends through the pivot cover 36. In this configuration, the male connector 208 including the button extender 206 of the receiver 198 extends past the top of the bushing 32a and mateably engages the seat mounting bracket 102 female connector 124, and the annular rib 126 of the seat mounting bracket resides in the channel 40 of the tablet mounting assembly pivot cover 36. The button extender 206 abuts the lever 136. To vertically adjust the height of the seating unit 10, a user engages the lever 136 which depresses the button extender 206. In turn, the button extender 206 depresses the gas cylinder actuator button 138 to provide vertical adjustment of the seating unit. Advantageously, the height of the tablet assembly is adjustable in tandem with the seat structure 12 when the gas cylinder 140 is activated.

For a seating unit 10 having either a tripod base support 150 or pedestal base support 196, the pivot assembly 24 and base mounting assembly 144 advantageously cooperate to allow a seated user to pull the tablet 28 closer, or push it farther away, maintaining the front edge of the tablet perpendicular to the centerline of the seat, with minimal side-to-side displacement of the tablet. This cooperation between the pivot assembly 24 and base mounting assembly 144 allows users of various sizes to comfortably use the tablet 28.

As illustrated in FIGS. 2, 4, 8 and 10, the seating unit 10 may be assembled without a tablet assembly 16. In particular, to assemble the seating unit 10 including a base 14 having a tripod base support 150, the base tube 184 is inserted into the seat mounting bracket 102, with the top end 192 mateably engaging the female connector 124. Similarly, to assemble the seating unit 10 including a base 14 having a pedestal base support 196, the receiver 198 is inserted into the seat mounting bracket 102, with the male connector 208 including the button extender 206 mateably engaging the female connector 124. A seating unit 10 not including a tablet assembly 16 may also include an aesthetic cover positioned between the base mounting assembly 144 and seat mounting bracket 102. Alternatively, a seating unit 10 without a tablet assembly 16 may be constructed by omitting the receiver 198, the button extender 206 and any aesthetic covers. The tapered top of the gas cylinder 140 would mateably engage the female connector 124 of the mounting bracket 102, and the lever 136 would directly activate top activator button 138.

The seating unit 10 is easy to ship in a ready-to-assemble form with the seat structure 12, base 14 and optional tablet assembly 16 separate. This saves space and reduces packaging costs, while minimizing final assembly labor and complexity. Final assembly of the seating unit 10 is accomplished by optionally placing the tablet assembly 16 onto the base 14 and then placing the seat structure 12 onto the base and applying downward pressure. The final assembly processes disclosed above require no tools or small parts or hardware items which can be lost.

The invention claimed is:

1. A seating assembly comprising:
    a seat structure including a seat member having an undersurface and a seat edge;
    a mounting bracket mounted to the undersurface of the seat member;
    a base including a central hub and a plurality of leg members extending downward from the central hub to lower leg ends, the mounting bracket mounted to the base spaced above the central hub, a first vertical axis passing through the central hub;
    a base tube mounted to and extending upward along the first vertical axis from the central hub;
    a mounting collar mounted to the base tube for rotation about the first vertical axis, the mounting collar positioned proximate and below the mounting bracket and located at least in part between the mounting bracket and the central hub;
    a support arm having first and second ends, the first end mounted to the mounting collar for rotation therewith about the vertical axis, the support arm extending radially outward from the mounting collar along the undersurface of the seat member and upward to the second end;
    a tablet member having a top surface, the tablet member mounted to the second end of the support arm with the top surface substantially horizontal; and
    at least one storage pan mounted to at least first and second of the plurality of leg members, an upward facing surface of the storage pan providing a support surface for storing items.

2. The assembly of claim 1 wherein the storage pan is further mounted to at least a third of the plurality of leg members.

3. The assembly of claim 2 wherein the storage pan forms an upwardly concave top surface between the plurality of leg members.

4. The assembly of claim 1 further including casters that support the leg members.

5. The assembly of claim 1 wherein the collar forms part of a mounting assembly, the mounting assembly forming stop surfaces that restrict rotation of the collar and the support arm with respect to the seat structure to within a range between first and second positions, the range including at least 110 degrees of rotation.

6. The assembly of claim 5 wherein the second end of the support arm is to one side of the seat member when the support arm is in the first position and to a different side of the seat member when the support arm is in the second position.

7. The assembly of claim 6 wherein the range is substantially 110 degrees and wherein the second end of the support arm is located to a lateral side of the seat member when the support arm is in the first position and to a front side of the seat member when the support arm is in the second position.

8. The assembly of claim 6 wherein the base further includes casters that support the leg members.

9. The assembly of claim 6 wherein the tablet member has an elongated shape and a long edge that extends along a long dimension of the tablet member, the assembly further including a pivot subassembly that couples the second end of the support arm to an undersurface of the tablet for rotation about a second substantially vertical axis, the pivot subassembly including stop surfaces that restrict rotation of the tablet member with respect to the support arm through a range of rotation between first and second end positions wherein, when viewed from a top view, the long edge forms an acute angle with the support arm in every position within the range between the first and second end positions.

10. The assembly of claim 9 wherein the mounting assembly also mounts the seat member to the base for rotation about the vertical axis.

11. The assembly of claim 5 wherein the mounting assembly also mounts the mounting bracket and the seat member to the base for rotation about the first vertical axis.

12. The assembly of claim 11 wherein the seat member is rotatable through 360 degrees about the first vertical axis.

13. The assembly of claim 1 wherein each of the leg members also extends radially outward from the central hub to the lower end of the leg, the upward facing surface of the storage pan accessible through an opening between the first and second leg members.

14. A seating assembly comprising:
a seat structure including a seat member having an undersurface and a seat edge;
a base including a central hub and a plurality of leg members that extend downward from the central hub to lower leg ends, the seat member mounted to the base with the undersurface spaced above and facing a top surface of the central hub, a first vertical axis passing through the central hub;
a base tube mounted to and extending upward along the first vertical axis from the central hub;
a mounting collar mounted to the base tube for rotation about the first vertical axis, the mounting collar at least in part located between the undersurface of the seat member and the central hub;
a support arm having first and second ends, the first end mounted to the mounting collar for rotation therewith about the first vertical axis, the support arm extending radially outward from the mounting collar along the undersurface of the seat member and upward to the second end;
a tablet member having a top surface, the tablet member mounted to the second end of the support arm with the top surface substantially horizontal; and
a storage pan mounted to at least first and second of the plurality of leg members at a height below the seat member, the storage pan including an upwardly facing top surface forming a storage space below the seat member and at last in part between the at least first and second leg members.

15. The assembly of claim 14 wherein the plurality of leg members includes at least three leg members and wherein casters support the lower ends of the leg members.

16. The assembly of claim 15 wherein the collar forms part of a mounting assembly, the mounting assembly forming stop surfaces that restrict rotation of the collar and the support arm with respect to the seat structure to within a range between first and second positions, the range including at least 110 degrees of rotation.

17. The assembly of claim 16 wherein the second end of the support arm is located to a lateral side of the seat member when the support arm is in the first position.

18. The assembly of claim 17 wherein the mounting assembly also mounts the seat member to the base for rotation about the first vertical axis.

19. The assembly of claim 18 wherein the tablet member has an elongated shape and a long edge that extends along a long dimension of the tablet member, the assembly further including a pivot subassembly that couples the second end of the support arm to an undersurface of the tablet for rotation about a second substantially vertical axis, the pivot subassembly including stop surfaces that restrict rotation of the tablet member with respect to the support arm to a range of rotation between first and second end positions wherein, when viewed from a top view, the long edge forms an acute angle with the support arm in every position within the range between the first and second end positions.

20. The assembly of claim 19 wherein the plurality of leg members includes at least three leg members and wherein the storage pan is mounted to each of the plurality of leg members and forms a top surface that includes a substantially flat horizontal central section.

21. The assembly of claim 19 wherein the tablet member is substantially rectangular having first and second long edges and first and second short edges, the second end of the support arm mounted to a portion of the undersurface of the tablet member closer to the second first long edge than to the second long edge and closer to the first short edge than to the second short edge.

22. A seating assembly comprising:
a seat structure including a seat member having an undersurface and a seat edge;
a base including a central hub and a plurality of leg members that extend downward and radially outward from the central hub to lower leg ends, the seat member mounted to the base with the undersurface spaced above and facing a top surface of the central hub, a first vertical axis passing through the central hub;
a base tube mounted to and extending upward along the first vertical axis from the central hub;
a mounting assembly including a mounting collar mounted to the base tube for rotation about the first vertical axis, the mounting collar at least in part located between the undersurface of the seat member and the central hub, the mounting assembly further including stop surfaces to limit the range of collar rotation about the first vertical axis to within a range between first and second positions;
a support arm having first and second ends, the first end mounted to the mounting collar for rotation therewith about the first vertical axis, the support arm extending radially outward from the mounting collar along the undersurface of the seat member and upward to the second end;
an elongated tablet member having a first long edge that extends along a length dimension and first and second short edges at opposite ends of the first long edge, a tablet top surface and a tablet undersurface;
a pivot assembly coupling the second end of the support arm to the undersurface of the tablet member at a location closer to the first short edge than to the second short edge, to facilitate rotation of the tablet member about a second vertical axis, the pivot assembly including stop surfaces that limit rotation of the tablet member about the second vertical axis with respect to the support arm to within a range between first and second positions in which, when viewed from a top view, the first long edge forms an acute angle with the support arm in all positions within the range of positions between the first and second positions; and
a storage pan mounted to at least first and second of the plurality of leg members at a height below the seat member, the storage pan including an upwardly facing top surface forming a storage space below the seat member and at last in part between the at least first and second leg members.

* * * * *